United States Patent
Dankberg et al.

(10) Patent No.: US 12,542,747 B2
(45) Date of Patent: *Feb. 3, 2026

(54) DELAYCAST QUEUE PRIORITIZATION

(71) Applicant: VIASAT, Inc., Carlsbad, CA (US)

(72) Inventors: Mark D. Dankberg, Encinitas, CA (US); Daniel M. Newman, Littleton, MA (US); Steven R. Hart, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 1045 days.

This patent is subject to a terminal disclaimer.

(21) Appl. No.: 17/543,403

(22) Filed: Dec. 6, 2021

(65) Prior Publication Data

US 2022/0255877 A1   Aug. 11, 2022

Related U.S. Application Data

(63) Continuation of application No. 16/436,073, filed on Jun. 10, 2019, now Pat. No. 11,212,234, which is a
(Continued)

(51) Int. Cl.
*H04L 47/56* (2022.01)
*H04L 12/18* (2006.01)
(Continued)

(52) U.S. Cl.
CPC ............ *H04L 47/56* (2013.01); *H04L 12/18* (2013.01); *H04L 12/1881* (2013.01);
(Continued)

(58) Field of Classification Search
None
See application file for complete search history.

(56) References Cited

U.S. PATENT DOCUMENTS 6,832,239 B1   12/2004   Kraft
8,432,808 B1   4/2013   Dankberg et al.
(Continued)

FOREIGN PATENT DOCUMENTS

WO   2013188104 A2   12/2013

OTHER PUBLICATIONS

U.S. Appl. No. 16/044,358, filed Jul. 24, 2018, 62 pgs.
(Continued)

*Primary Examiner* — Christopher M Crutchfield
(74) *Attorney, Agent, or Firm* — HOLZER PATEL DRENNAN

(57) ABSTRACT

Systems and methods are described for optimizing resource utilization in a communications network while also optimizing subscriber engagement with media content over the communications network. Requested content objects can be identified as delayable objects that can be queued for opportunistically delayed communication to both requesting and non-requesting subscribers. Queued delayed content objects are scored with an eye toward optimizing both subscriber engagement and utilization of opportunistically available communications link resources. For example, a storage manager calculates a likelihood that each subscriber will engage with the content if it is opportunistically delivered, and a scheduler calculates a priority order in which to queue each requested delayable content object. Content objects can then be multicast to the subscribers in priority order and with associated information that can be used by the subscribers to determine whether to locally store the content objects as they are opportunistically received.

38 Claims, 10 Drawing Sheets

Related U.S. Application Data continuation of application No. 14/836,815, filed on Aug. 26, 2015, now Pat. No. 10,361,964, which is a continuation of application No. 13/830,671, filed on Mar. 14, 2013, now Pat. No. 9,154,436.

(51) Int. Cl.

| | | |
|---|---|---|
| *H04L 47/80* | (2022.01) | |
| *H04L 67/56* | (2022.01) | |
| *H04L 67/566* | (2022.01) | |
| *H04L 67/5682* | (2022.01) | |

(52) U.S. Cl.
CPC ............ *H04L 47/806* (2013.01); *H04L 67/56* (2022.05); *H04L 67/566* (2022.05); *H04L 67/5682* (2022.05)

(56) References Cited

U.S. PATENT DOCUMENTS

| | | | |
|---|---|---|---|
| 8,848,535 B2 | 9/2014 | Dankberg et al. | |
| 8,893,199 B2 | 11/2014 | Grannan | |
| 9,065,906 B2 | 6/2015 | Dankberg et al. | |
| 9,154,436 B2 | 10/2015 | Dankberg et al. | |
| 10,044,637 B2 | 8/2018 | Dankberg et al. | |
| 10,361,964 B2 | 7/2019 | Dankberg | |
| 10,594,642 B2 | 3/2020 | Pankberg | |
| 2002/0071395 A1 | 6/2002 | Redi et al. | |
| 2002/0073167 A1* | 6/2002 | Powell ................ H04L 12/5692 709/217 |
| 2002/0199200 A1 | 12/2002 | Addington | |
| 2003/0069964 A1 | 4/2003 | Shteyn et al. | |
| 2004/0042479 A1 | 3/2004 | Epstein et al. | |
| 2004/0267880 A1 | 12/2004 | Patiejunas | |
| 2006/0126667 A1 | 6/2006 | Smith et al. | |
| 2007/0174471 A1 | 7/2007 | Canb Rossum | |
| 2008/0192820 A1 | 8/2008 | Brooks et al. | |
| 2008/0320222 A1 | 12/2008 | Dhodapkar | |
| 2010/0180046 A1 | 7/2010 | Sebastian et al. | |
| 2011/0110231 A1 | 5/2011 | Langford | |
| 2012/0094593 A1 | 4/2012 | Burr | |
| 2012/0144117 A1* | 6/2012 | Weare ................ G06F 12/0888 711/119 |
| 2012/0149346 A1* | 6/2012 | Akhtar ................ H04W 72/04 455/414.2 |
| 2012/0173746 A1 | 7/2012 | Salinger et al. | |
| 2012/0265856 A1* | 10/2012 | Major .................. H04L 65/756 709/219 |
| 2013/0080701 A1 | 3/2013 | Markovitz et al. | |
| 2013/0215756 A1* | 8/2013 | Jeon ....................... H04L 47/12 370/238 |
| 2013/0237233 A1 | 9/2013 | Radulescu | |
| 2013/0336190 A1 | 12/2013 | Dankberg et al. | |
| 2014/0269484 A1 | 9/2014 | Dankberg et al. | |
| 2014/0362761 A1 | 12/2014 | Dankberg et al. | |
| 2016/0021021 A1 | 1/2016 | Dankberg et al. | |

OTHER PUBLICATIONS

Non-Final Office Action mailed in U.S. Appl. No. 14/719,104 on Sep. 19, 2016, 13 pgs.

Non-Final Office Action mailed in U.S. Appl. No. 14/719,104 on Apr. 17, 2017, 12 pgs.

Non-Final Office Action mailed in U.S. Appl. No. 14/719,104 on Oct. 16, 2017, 7 pgs.

International Search Report and Written Opinion mailed in International (PCT) Application No. PCT/US2013/043038 on Jan. 21, 2014, 10 pgs.

International Preliminary Report on Patentability mailed in International (PCT) Application No. PCT/US2013/043038 on Dec. 16, 2014, 7 pgs.

Non-Final Office Action mailed in U.S. Appl. No. 14/719,104 on Mar. 4, 2016, 8 pgs.

\* cited by examiner

DELAYCAST QUEUE PRIORITIZATION

RELATED APPLICATIONS

This application is a continuation of U.S. application Ser. No. 16/436,073, filed on Jun. 10, 2019, which is a continuation of U.S. application Ser. No. 14/836,815, filed on Aug. 26, 2015, which is a continuation of U.S. application Ser. No. 13/830,671, filed on Mar. 14, 2013, now U.S. Pat. No. 9,154,436, the entirety of which is incorporated herein by reference.

FIELD

Embodiments relate generally to communications systems, and, more particularly, to queue prioritization and subscriber engagement in communications systems.

BACKGROUND

Users of communications services are increasingly accessing media content over data communications networks, like the Internet, through content service providers, web portals, games, interactive electronic program guides, and/or other user interfaces. Typically, media content providers desire to maximize their consumers' (e.g., subscribers) engagement with particular media. For example, media content providers provide various marketing, incentive, and other techniques to help consumers find and access desirable content and/or to nudge the consumers toward particular content, thereby increasing profitability, advertising opportunities, etc.

The resulting increase in consumer engagement with media content yields an increased demand for bandwidth resources of the underlying communications infrastructures. In some cases, communications service providers attempt to combat ever-increasing demands on their networks through increased prices, resource throttling, limitations on service offerings, etc. The result can be a conflict between the desire of media content providers to maximize profitable media engagement and the desire of communications service providers to maximize profitable infrastructure resource utilization.

Some approaches strive to better utilize communications resources while also satisfying increasing demands for those resources through time- and/or demand-shifting techniques. Traditional time- and demand-shifting techniques tend to rely on coarse predictions from limited information regarding either subscriber behavior or network behavior. These traditional approaches do not typically support opportunistic exploitation of dynamically changing resource availability and consumer behaviors across the communications infrastructure.

BRIEF SUMMARY

Among other things, systems and methods are described for optimizing resource utilization in a communications network while also optimizing subscriber engagement with media content over the communications network. Embodiments operate in context of subscribers to a media plan that facilitates subscriber access to media content over a communications network having shared communications links (e.g., a satellite network). Requested content objects can be identified as delayable objects that can be queued for opportunistically delayed communication to both requesting and non-requesting subscribers. Queued content objects are scored with an eye toward optimizing both subscriber engagement and utilization of opportunistically available communications link resources. For example, a storage manager calculates a likelihood that each subscriber (e.g., or cluster of one or more subscriber) will engage with the content if it is opportunistically delivered to the subscriber relative to other content already stored or requested by the subscriber, and a scheduler calculates a priority order in which to queue each content object relative to the rest of the queue. Content objects can then be multicast to the subscribers in priority order and with associated information that can be used by the subscribers to determine whether to locally store the content objects as they are opportunistically received. For example, implementations use these techniques to communicate the delayable content objects in such a way that opportunistically exploits link resources while maximizing subscriber engagement and satisfaction.

According to one set of embodiments, a method is provided for prioritizing communications of content objects in a communications infrastructure that provides sharing of a communications link over which a provider-side system is in communication with a number of subscriber-side systems. The method includes: determining, by a provider-side system, that a content object received at the provider-side system is a delayable content object requested by at least one of a number of subscriber-side systems, the subscriber-side systems being associated with a number of subscriber clusters; calculating, by the provider-side system, a scheduler score for the delayable content object according to a set of link-level scalars; calculating, by the provider-side system, a set of storage scores for the delayable content object according to a set of storage-level scalars as applied to at least some of the subscriber clusters; assigning the delayable content object to a provider-side queue of content objects in a priority order according to the scheduler score of the delayable content object; and multicasting the content objects from the queue to the subscriber-side systems along with associated control data corresponding to the respective storage scores of the content objects and usable by the subscriber-side systems in determining whether to locally store the content objects.

According to another set of embodiments, a provider-side system is provided for prioritizing communications of content objects in a communications infrastructure that provides for communications with a number of subscriber-side systems over a shared communications link. The provider-side system includes: a content handling subsystem configured to determine that a content object received at the provider-side system is a delayable content object requested by at least one of a number of subscriber-side systems, the subscriber-side systems being associated with a number of subscriber clusters; a link scheduler subsystem, in communication with the content handling subsystem, and configured to calculate a scheduler score for the delayable content object according to a set of link-level scalars; a storage manager subsystem, in communication with the content handling subsystem, and configured to calculate a set of storage scores for the delayable content object according to a set of storage-level scalars as applied to at least some of the subscriber clusters; and a communications subsystem, in communication with the link scheduler subsystem and the storage manager subsystem. The communications subsystem is configured to: assign the delayable content object to a queue of content objects in a priority order according to the scheduler score of the delayable content object; and multicast the content objects from the queue to the subscriber-side systems along with associated control data corresponding to the respective storage scores of the content objects and usable by the subscriber-side systems in determining whether to locally store the content objects.

According to another set of embodiments, a subscriber-side system is provided for opportunistically receiving communications of content objects from a provider-side system via a shared communications link of a communications infrastructure. The subscriber-side system includes: a communications subsystem configured to receive a number of content objects along with associated control data from a queue of the provider-side system, the queue being prioritized according to a scheduler score for each content object calculated according to a set of link-level scalars, and the associated control data corresponding to a set of storage scores for each content object calculated according to a set of storage-level scalars; a subscriber cache having a number of previously stored cached content objects; and a subscriber storage manager, in communication with the communications subsystem and the subscriber cache, and configured to determine whether to locally store the received content objects in the subscriber cache according to their associated control data.

In some such embodiments, the associated control data received by the communications subsystem comprises the storage scores associated with the received content objects; and the subscriber storage manager is configured to determine whether to locally store the received content objects in the subscriber cache according to their associated control data by: comparing the storage scores associated with the received content objects against storage scores associated with the cached content objects; and determining to store each received content object in the subscriber cache when its storage scores indicate a higher likelihood of subscriber engagement than do the storage scores of any of the cached content objects. For example, the subscriber storage manager is further configured, when determining to store each received content object in the subscriber cache when its storage scores indicate a higher likelihood of subscriber engagement than do the storage scores of any of the cached content objects, to: identify at least one of the cached content objects as having associated storage scores indicating a lower likelihood of subscriber engagement than that of the received content object; remove the identified at least one of the cached content objects from the subscriber cache; and store the received content object in the subscriber cache. In other such embodiments, the associated control data received by the communications subsystem comprises directives associated with the received content objects instructing the subscriber storage manager whether to store the received content objects; and the subscriber storage manager is configured to determine whether to locally store the received content objects in the subscriber cache according to their associated control data according to the directives. In still other such embodiments, the received content objects each comprise a plurality of content chunks; and the subscriber storage manager is configured to determine whether to locally store the received content objects in the subscriber cache based on one or more of the content chunks. And in other such embodiments, the subscriber storage manager is further configured to communicate information to the provider-side system indicating its determinations of whether to locally store the particular received content objects in the subscriber cache according to their associated control data.

BRIEF DESCRIPTION OF THE DRAWINGS

The present disclosure is described in conjunction with the appended figures.

Figure 1:
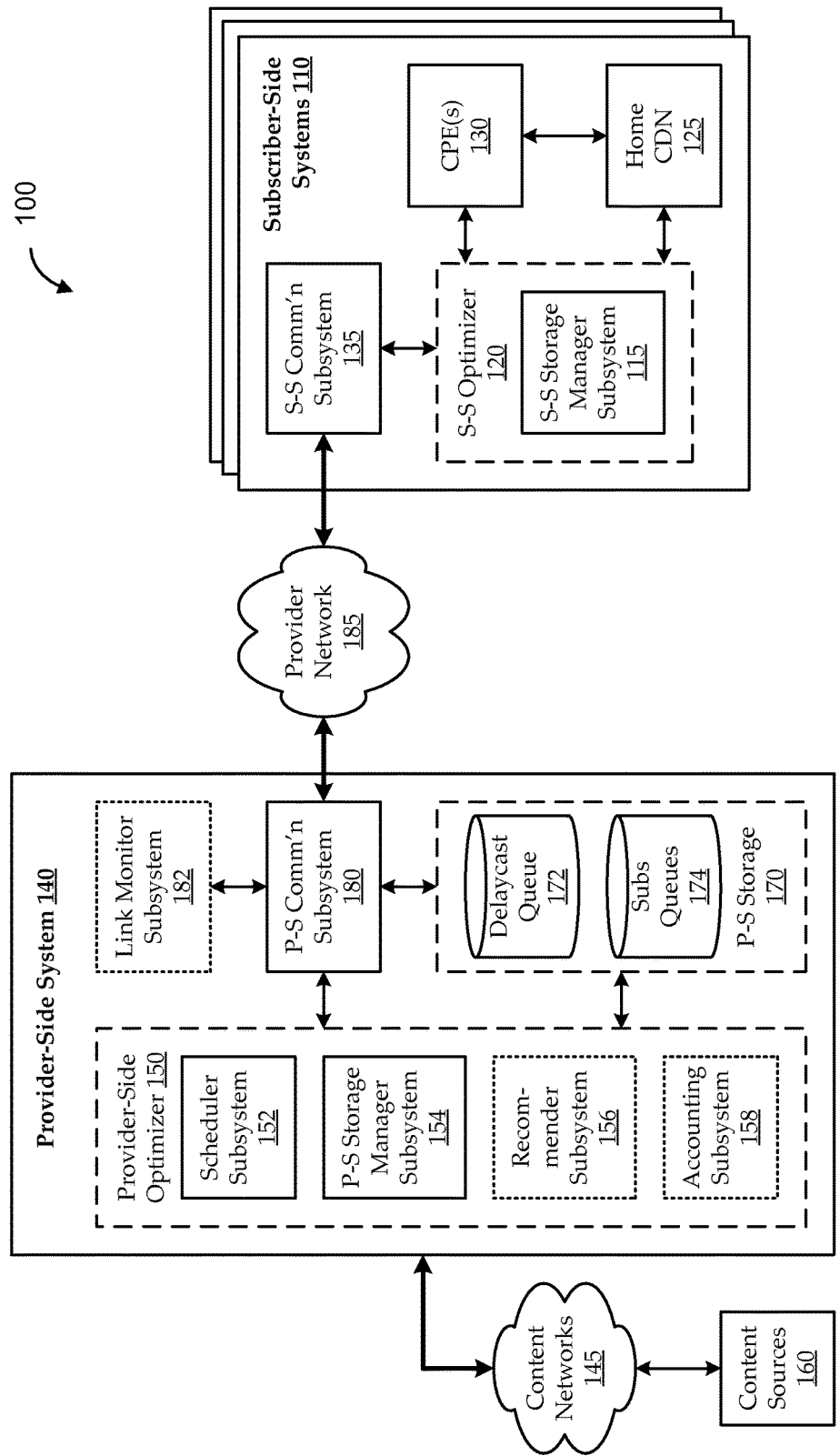
FIG. 1 shows a block diagram of an embodiment of a communications system having a provider-side system in communication with multiple subscriber-side systems over a provider network.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

The desires of content providers to maximize content offerings and access to consumers are often in direct conflict with desires of network resource providers to service their customer's with limited communications resources. A number of traditional techniques exist for increasing consumer engagement with content or for optimizing utilization of communications resources. However, these techniques generally rely on limited information and have limited effect, for example, due to constant and dynamic changes in resource availability and consumer behavior across the communications infrastructure. Techniques discussed herein opportunistically exploit these dynamic changes in an attempt to maximize consumer engagement and satisfaction within a limited communications resource context.

In one illustrative implementation, subscribers to a media plan request media content objects. Some of that content is identified as "delayable" content, such that it can be queued for opportunistically delayed delivery to subscribers (e.g., by explicit request or based on other factors). Each subscriber, or groups of subscribers, can be considered as a subscriber cluster having associated characteristics, such as preferences, consumption history, device capabilities, etc. The delayable content objects are associated with storage scores calculated based on some or all of the subscriber cluster-level characteristics. For example, each delayable content object is associated with a multi-dimensional storage score for each subscriber cluster that reflects a likelihood that the subscriber cluster will engage with the content object if it is opportunistically delivered. These storage scores can be used by provider-side and or subscriber-side functions to determine whether a particular content object should be locally stored by a particular subscriber at the expense of previously stored data (e.g., assuming a steady-state scenario in which a subscriber's local cache is full). The delayable content objects are also associated with scheduler scores calculated based on one or more link-level characteristics. The content objects are queued in a priority order according to their scheduler scores and are communicated from the queue to the subscribers along with information that can be used by the subscribers' systems to determine whether to locally store the received content objects according to the appropriate storage scores.

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention. While a number of embodiments are described with specific reference to "media," embodiments operate generally in context of any common content, including, for example, software distribution, online periodical distribution (e.g., magazines, etc.), application distribution (e.g., apps, etc.), etc. Further, terms such as "optimize" or "maximize" are intended to connote a relative or desired outcome, rather than an absolute outcome, and should not be considered as limiting potential embodiments. For example, embodiments described with reference to optimization are intended to include even variations deemed to be sub-optimal. Further, a number of "opportunistic" techniques are described herein, and are intended broadly to include techniques for dynamically optimizing infrastructure resources based on present usage of those resources, for example, using opportunistic time shifting and/or opportunistic delay shifting techniques.

Turning first to FIG. 1, a block diagram is shown of an embodiment of a communications system 100 having a provider-side system 140 in communication with multiple subscriber-side systems 110 over a provider network 185. The provider network 185 can include one or more of any suitable type of communications link and can be part of one or more of any suitable type of network, including, for example, leased high-bandwidth lines (e.g., raw Ethernet), virtual private large-area network services (VPLS), Internet protocol virtual private networks (IP VPN), or other types of public or private, wired or wireless networks.

Some functionality exploits resource sharing over multiple communications links of the provider network 185. Certain network architectures allow bandwidth resources to be shared through multicasting (e.g., including multicasting, point-to-multipoint, broadcasting, etc.) and/or other techniques. In one illustrative implementation, the communications system 100 is a satellite communications network with a provider-side system 140 (e.g., in a gateway or core node) in communication with subscriber terminals of subscriber-side systems 110 over satellite communications links (e.g., via carriers of spot beams of one or more satellites). For example, each communications link of the provider network 185 includes one or more antennas, satellites, etc. As communications are essentially broadcast from the satellite to the subscriber terminals, multicasting techniques can be used to communicate content once for receipt by multiple subscribers concurrently. Similar techniques can be used with certain other wireless communications link architectures. Some other wired infrastructures can also use similar techniques in shared portions of the network. For example, a cable network can be architected to have a shared pipe between a cable head-end and an intermediate node (e.g., a neighborhood aggregator), at which node the shared pipe splits into individual pipes (e.g., to each household). Resources of the shared pipe can often be shared using similar techniques to those described above.

Some embodiments are described herein with respect to downstream traffic and sharing of forward link bandwidth resources. Similar techniques can also be applied with respect to upstream traffic and/or sharing of return link resources. For example, certain media upload contexts, including peer-to-peer implementations, can exploit functionality described herein in a manner that shares return link bandwidth resources.

The provider-side system 140 is further in communication with one or more content sources 160 via one or more content networks 145. The content sources 160 can include content servers and/or other suitable sources. Further, the content networks 145 are intended generally to include any suitable public or private, wired or wireless (e.g., short-range or long range, cellular, satellite, etc.) network components, nodes, or networks used to deliver content to subscriber-side systems 110 via provider-side system 140. While the content sources 160 and content networks 145 are shown as separate from the provider-side system 140, they can be implemented in any suitable manner, including as part of the provider-side system 140. Some functionality described herein relates to provision of media content, such as movies, over the communications system 100. Accordingly, at least some of the content sources 160 are assumed to be sources of media content objects. For example, a content source 160 can be a content service provider website that provides users with access to movies, music, and/or other media over the Internet via their respective subscriber-side systems 110 and provider-side system 140.

Various types of functionality are described herein relating to communications between the provider-side system 140 on a provider side of the communications system 100 infrastructure and the one or more subscriber-side systems 110 on a subscriber side of the communications system 100 infrastructure. As illustrated, the provider-side system 140 includes a provider-side communications subsystem 180, and the subscriber-side systems 110 include subscriber-side communications subsystems 135. Each of the provider-side communications subsystem 180 and the subscriber-side systems 110 include functionality to support communications over the provider network 185, such as protocol support, service flow management, routing, etc. In some implementations, the provider-side system 140 acts substantially as a server and the subscriber-side systems 110 act substantially as clients, and communications between the systems over the provider network 185 can be considered client-server communications over client-server links (e.g., persistent links between proxy clients and proxy servers). Accordingly, provider-side functions can be implemented as functions of server-side systems or components, service provider systems or components, gateways, head-ends, or the like without departing from embodiments. Similarly, subscriber-side functions can be implemented as functions of user-side systems or components, client-side systems or components, customer premises devices, subscriber modems, subscriber devices, or the like without departing from the scope of embodiments.

In some cases, various functions described herein are only available to subscribers of certain services from a service provider, such as subscribers to a media plan. The service provider can own and/or control some or all of the components that facilitate the functionality, such as the provider-side system 140. In some embodiments, the service provider also owns some or all of the content sources 160, subscriber-side systems 110, infrastructure components, etc. For example, a service provider offers certain functionality to subscribers by virtue of relationships with content providers, relationships with subscribers, ownership or control of provider-side systems, and ownership or control of certain subscriber-side devices.

In some instances, a single subscriber is associated with subscription services, and any subscriber-side devices used with those services are associated with that subscriber. In other instances, a single subscriber is associated with subscription services, but the subscriber can access services nomadically or otherwise, including through devices that are not associated with that subscriber (e.g., by logging in to a service, etc.). In still other instances, one or more subscribers are associated with subscription, but the media services can be accessed by additional users. For example, a subscriber can own a television through which subscription media services can be accessed by anyone in the house, including non-subscriber members of the household, guests, etc. In even other instances, one or more human or machine agents are associated with the subscriber and can interface with services on the subscriber's behalf. For example, a smart device disposed in the subscriber's network (e.g., integrated in or in line with the subscriber's modem, set-top box, etc.) can monitor user behavior and/or use other information to make smart requests for content on behalf of the subscriber. In some implementations, these smart requests are considered by the provider just as any other explicit request by the subscriber. Accordingly, while certain functionality can be governed by (e.g., handled according to) a relationship between the subscriber and the provider, it is not always the subscriber (or a particular subscriber-associated device) that is interacting with, exploiting, and/or facilitating those services. Embodiments are intended generally to operate in and account for any of those scenarios, even though, for the sake of simplicity, embodiments are described with reference to the subscriber making content requests, interacting with subscription services via devices and interfaces, etc.

Further, various embodiments are described with reference to a "requesting" or "non-requesting" subscriber, or the like. These types of designations are intended only to suggest a particular user's role for a particular transaction. The same user can be a non-requesting user in one transaction and the requesting user in a different transaction (e.g., at the same or different times). Even further, though only a single requester is shown for the sake of simplicity, a single transaction can involve multiple requesters, and/or multiple transactions can be processed concurrently such that the network includes many concurrent requesting and non-requesting users. For example, when a subscriber requests content, the content can end up being multicast to the requesting subscriber and one or more non-requesting subscribers.

As will be described more fully below, embodiments of the subscriber-side systems 110 are configured to perform various types of functionality using a subscriber optimizer 120. For example, the subscriber optimizer 120 can help manage content requests from subscribers and content delivery to subscribers via subscriber devices. In some implementations, the subscriber optimizer 120 is in communication with the provider optimizer 150 of the provider-side system 140 in such a way as to effectuate advanced optimization functions. For the sake of simplicity, certain client-server types of functionality can be referred to as involving communications over virtual (or logical) communications links, though these "links" can, in fact, include a number of physical links from one or more communications infrastructures. For example, the subscriber optimizer 120 and the provider optimizer 150 can act as a proxy client and a proxy server, respectively, in communication over a proxy tunnel that facilitates acceleration, optimization, and other functionality.

Embodiments of the subscriber-side systems 110 include subscriber-side communications subsystems 135 as part of their respective subscriber-side optimizers 120. The subscriber-side communications subsystems 135 can transmit communications to and receive communications from the provider network 185 and can perform any suitable transport-level and/or related processing. For example, when a signal is received from the provider network 185, the subscriber-side communications subsystems 135 can amplify the signal, acquire the carrier, downconvert the signal, etc. Though not explicitly shown, other components and/or component functionality can be provided by the subscriber-side communications subsystems 135. For example, a media access control (MAC) module can provide certain network interface functionality, such as modulating, encoding, filtering, decrypting, and/or otherwise processing data. Other functionality can be provided by routers, switches, and/or the like. These and or other components can also process data upon receipt and/or prior to transmission using techniques, such as modulating and demodulating, encoding and decoding, multiplexing and de-multiplexing, filtering, parsing, packetizing, etc. Embodiments of the subscriber-side communications subsystems 135 can also include other communications functionality for supporting local and/or other networking, such as hub, router, switch, and/or similar functionality for supporting a local area (e.g., WiFi) networks, Bluetooth networks, Ethernet networks, femtocells, and/or other wired or wireless networks.

In some embodiments, the subscriber-side systems 110 include one or more customer premises devices (e.g., set-top boxes, televisions, home network devices, etc.), referred to as "customer premises equipment" or "CPE" 130. The CPEs 130 can provide user interface functionality through which a subscriber can interact with service provisions, for example, by requesting media content, setting preferences, etc. Embodiments are also configured to implement a home content distribution network (CDN) 125. The home CDN 125 can include any useful types of storage and/or networking components. For example, embodiments of the home CDN 125 can include a single storage device (e.g., a server or disk drive), distributed local storage (e.g., a RAID array, set of servers, etc.), networked storage (e.g., using a local area network, a storage area network, "cloud" storage, or the like), etc. Various embodiments of the subscriber optimizer 120 are configured to manage (e.g., direct, monitor, etc.) functions of the CPE(s) 130, the home CDN 125, communications among those components, communications between those components and other nodes of the communications system 100, etc.

For added clarity, various functional subsystems are shown. These functional subsystems can be implemented by any suitable system, subsystem, or component shown or by others not shown. Embodiments of the subscriber-side systems 110 include a subscriber-side storage manager subsystem 135 implemented as a functional subsystem of the subscriber optimizer 120. The subscriber-side storage manager subsystem 135 handles various subscriber side storage functions, including, for example, determining what objects are stored in the home CDN 125, storing objects in and/or removing objects from the home CDN 125, etc.

Some subscriber-side systems 110 can be implemented as subscriber modems (e.g., satellite modems), dedicated devices, hardware or software of set-top boxes, or in any other suitable manner. In one illustrative implementation, the subscriber-side system 110 is embodied in a subscriber modem that includes a subscriber optimizer 120 (e.g., as integrated hardware and/or software) and has one or more ports for communicating with a home CDN 125 and one or more CPEs 130. For example, the subscriber modem has a universal serial bus (USB) port, and the home CDN 125 is implemented on a USB thumb drive. In other implementations, the home CDN 125 can be implemented using internal storage of the modem or as other types of removable storage, networked storage, etc. The CPEs 130 can include televisions or video monitors, computers (e.g., laptops, tablets, etc.), smart phones, smart appliances, and/or any other equipment that can benefit from services provided over the communications infrastructure (and/or support equipment thereto).

Embodiments of the provider-side system 140 include some or all of a scheduler subsystem 152, a provider-side storage manager subsystem 154, a recommender subsystem 156, and an accounting subsystem 158, all illustrated as functional subsystems of the provider optimizer 150. In general, and as will become clearer from the descriptions herein, implementations of the scheduler subsystem 152 seek to optimize both link resources and subscriber engagement from a resource-level (e.g., link-level) perspective; while implementations of the provider-side storage manager subsystem 154 seek to optimize both link resources and subscriber engagement from a subscriber-level (e.g., subscriber cluster-level, subscriber cache-level, etc.) perspective. For the sake of illustration, embodiments assume each subscriber-side system 110 is associated with one or more subscribers to a media plan (or other communications services plan). Under one illustrative plan, each subscriber has a data allowance policy (DAP) that permits the subscriber a certain amount of resource usage per month (e.g., some number of Gigabytes of download and/or upload data) at any time for any purpose in exchange for a certain monthly fee. The network resources are typically also provisioned for a certain amount of usage by a certain number of subscribers (e.g., a certain minimum rate, for example, in kilobits per second, is provisioned to each subscriber at various times of day. At any given time of day, a dynamically varying amount of link capacity tends to be unused on the provider network 185. For example, implementations of the provider-side system 140 include a link monitor subsystem 182 (illustrated as being in communication with the provider-side communications subsystem 180), which can monitor a present state of the provider network 185. The link monitor subsystem 182 can help determine how much excess (e.g., opportunistic) capacity is presently available, link quality (e.g., poor link conditions can limit effective capacity if adaptive coding and/or modulation schemes are used for reliable communications), etc. While a portion of this unused capacity is typically reserved for various reasons (e.g., to ensure satisfaction of contractual and/or other promises, like under subscribers' DAPs), some of the dynamically varying, unused capacity can still be considered excess capacity. This excess capacity (or similar types of capacity arising from other types of plans, policies, network architectures, etc.) is referred to herein as "opportunistic" capacity, as various time- and/or demand-shifting techniques can be used to opportunistically exploit at least a portion thereof.

In this context, subscriber requests for content can be categorized as "opportunistic" and "non-opportunistic" types of requests. Non-opportunistic requests are those which the subscriber desires to have fulfilled substantially immediately and for which the subscriber is willing to use capacity under the DAP. For example, the subscriber uses a web browser to stream a movie, and the capacity being used for that movie is accounted for according to the subscriber's monthly allowance under the DAP. By contrast, opportunistic types of requests can include any requests that can be fulfilled using opportunistic capacity. For example, under the media plan, content can be scheduled for anticipatory pre-pushing to subscribers at off-peak times, the subscriber can explicitly request to delay receipt of content at a reduced cost, content can be offered for delivery substantially in real time using presently available capacity, and/or content can be otherwise offered and/or communicated under the media plan in such a way that time-shifts or demand-shifts the communication to exploit opportunistic capacity. A request can be considered an opportunistic request regardless of how accounting is applied to fulfilling the request. For example, fulfillment of a request can result in a full or partial accounting against the subscriber's DAP (e.g., a full charge to the subscriber for downloading the requested content) even though it was fulfilled partially or completely using opportunistic capacity.

Content objects that are the requested in such a manner that can be classified as an opportunistic request are referred to herein as "delayable" objects. Content objects are typically classified as delayable content objects when it is determined that their delivery can be opportunistically delayed (e.g., by explicit request or based on other factors). As illustrated, embodiments of the provider-side system 140 include provider-side storage 170 having subscriber queues 174 and one or more "delaycast" queues 172. The delayable objects can be queued in the delaycast queue 172 for opportunistic delivery over the provider network 185.

Even though they are delayable, their delivery is not necessarily delayed. In some instances (e.g., due to certain available capacity, queue priority, fairness, etc.), a delayable object can be queued for substantially real-time (not delayed) delivery. Suppose a subscriber requests to download a movie over the Internet. In one instance, the subscriber opts to receive the movie now using promised DAP capacity, the movie is scheduled for delivery using that non-opportunistic capacity (e.g., in a subscriber queue 174) and the movie object is not considered a delayable object. In another instance, the subscriber opts for opportunistically delayed delivery of the movie (e.g., in exchange for a discount), the movie is scheduled for delivery at a later timeframe using opportunistic capacity (e.g., in a "watch later" portion of the delaycast queue 172), and the movie object is considered a delayable object. And in another instance, it is determined that the movie can be delivered to the subscriber now using available opportunistic capacity, the movie is scheduled for delivery now using that opportunistic capacity (e.g., in a "watch now" portion of the delaycast queue 172), and the movie object is again considered a delayable object.

While various components of the communications system 100 are used to fulfill non-opportunistic requests and to provide many other types of functionality, the description herein focuses on fulfillment of opportunistic requests. According to some embodiments, the delayable objects are assigned a "scheduler score" that accounts for a number of link-level characteristics. Implementations of the scheduler subsystem 152 can use the scheduler score to prioritize the delaycast queue 172 in a manner that attempts to balance optimizing communications resources against maximizing engagement across multiple subscribers. Delayable objects are also assigned a "storage score" that accounts for a number of subscriber cluster-level characteristics. Implementations of the provider-side storage manager subsystem 154 can use the storage scores to determine which subscribers (e.g., including both requesting and non-requesting subscribers) should store opportunistically delivered content in their respective home CDNs 125. In one implementation, the storage scores are used by the provider-side storage manager subsystem 154 to determine which subscriber-side systems 110 should store the content objects being communicated from the delaycast queue 172, and the provider-side storage manager subsystem 154 communicates directives to the subscriber-side systems 110 instructing them to store or not to store (e.g., to ignore) those content objects when they are received (e.g., based on a provider-side model of what is in the subscribers' home CDNs 125). In another implementation, the storage scores (or other information relating to the storage scores) are communicated to the subscriber-side systems 110, and the subscriber-side systems 110 can make their own determinations about whether to store those content objects when they are received (e.g., based on what is in their respective home CDNs 125). By prioritizing objects for opportunistic communications according to link-level characteristics, and by directing subscribers to opportunistically store the communicated objects according to cluster-level characteristics, implementations can realize concurrent optimizations across the network in both resource utilization and subscriber engagement.

Some embodiments of the provider-side system 140 include additional functional blocks. In some implementations, the provider-side optimizer 150 includes a recommender subsystem 156. While the recommender subsystem 156 can provide many different functions, the description herein focuses on the role of embodiments of the recommender subsystem 156 in contributing to the storage scores. For example, as described below, the recommender subsystem 156 can use subscriber characteristics (e.g., request and engagement histories, cache contents, subscriber relationships, etc.) to develop content recommendations for subscribers and/or to request content on behalf of subscribers or groups of subscribers for opportunistic delivery. For example, if a group of subscribers tends to request episodes of a particular television program, the recommender subsystem 156 can make determinations based on similar programming, issue requests for new episodes of the programming, etc.

Some implementations of the provider-side optimizer 150 also include an accounting subsystem 158. While the accounting subsystem 158 can provide many different functions, the description herein focuses on the role of embodiments of the accounting subsystem 158 in contributing to the scheduler and/or storage scores. For example, the accounting subsystem 158 can keep track of subscriber DAPs (e.g., monthly usage caps, subscriber tiers, loyalty programs, etc.), content pricing, infrastructure costs, and/or perform other account- or accounting-related functions. As described more fully below, this information can impact fairness and other constraints on which content can be offered to which subscribers at which times and for which prices.

Figure 2:
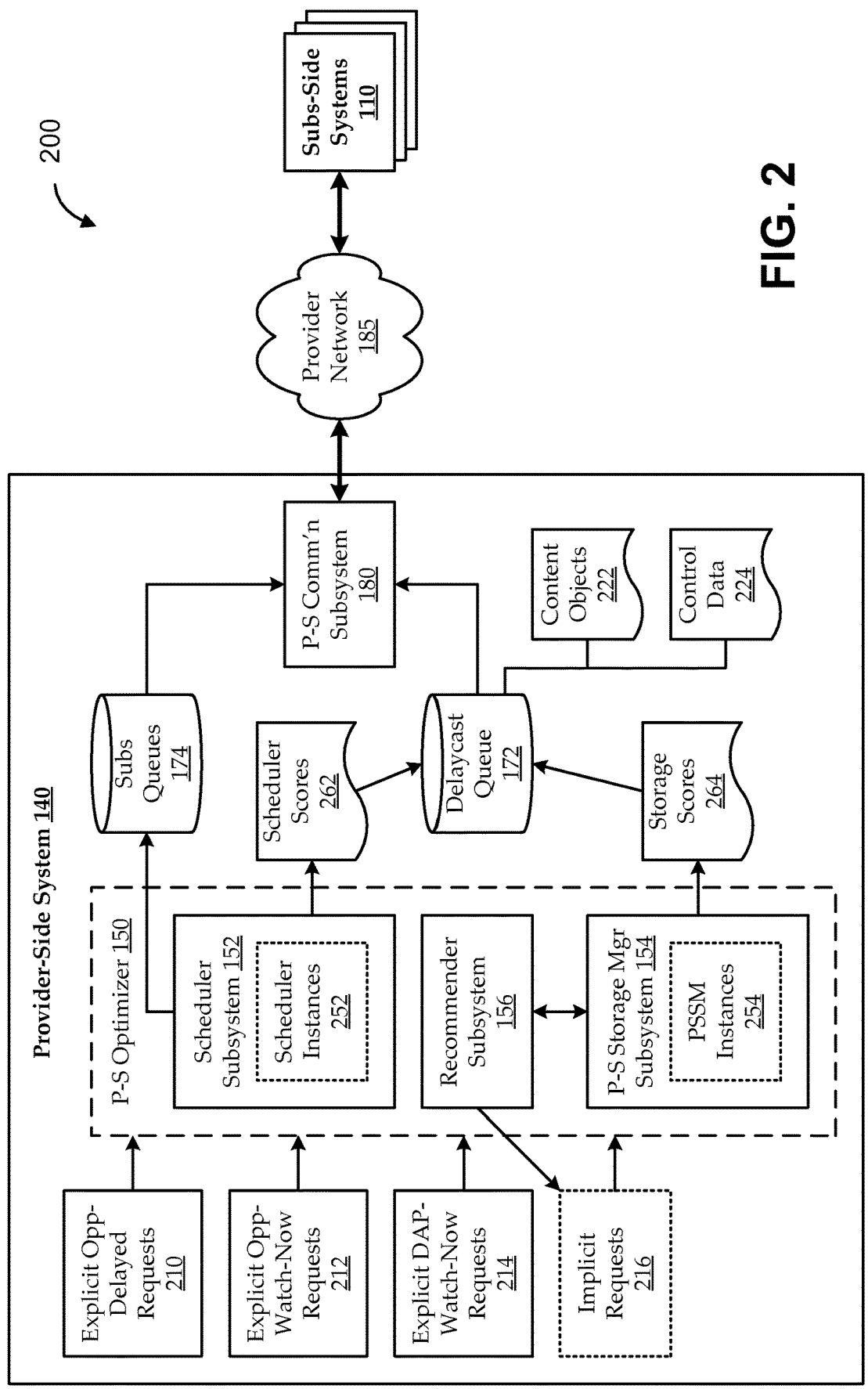
FIG. 2 shows another block diagram of an embodiment of a communications system having a provider-side system in communication with multiple subscriber-side systems over a provider network, according to various embodiments.

FIG. 2 shows another block diagram of an embodiment of a communications system 200 having a provider-side system 140 in communication with multiple subscriber-side systems 110 over a provider network 185, according to various embodiments. As illustrated, various types of requests for delayable content objects 222 are received by the provider-side system 140 and processed by functional components of the provider-side optimizer 150, including a scheduler subsystem 152 and a provider-side storage manager subsystem 154. As described with reference to FIG. 1, scheduler scores 262 and storage scores 264 are calculated and applied to delayable content objects 222 in an attempt to concurrently optimize both resource utilization and subscriber engagement across the provider network 185.

As illustrated, different types of requests can be received by the provider-side system 140 and determined to be opportunistic requests for delayable content objects. Two illustrative types of request are explicit opportunistic delayed requests 210 and explicit DAP-watch-now requests 214. For example, a subscriber selects a movie from a media portal (e.g., a website offering movies on a subscription basis), and is presented with options with to watch the movie now using promised capacity under the subscriber's DAP or to watch the movie later in exchange for a discount (e.g., watch in 24 hours for free). If the subscriber opts to watch the movie later for a discount, this can be considered an explicit request to delay delivery of the movie over opportunistic capacity (i.e., an "explicit opportunistic delayed request" 210), and the requested object can be considered a delayable content object. If the subscriber opts to watch the movie now using promised capacity under the subscriber's DAP, this can be considered a non-opportunistic request (i.e., an "explicit DAP-watch-now request" 214), and the requested object can be treated as a non-delayable content object. Yet another illustrative type of request is an explicit opportunistic watch now request 212. For example, it is determined that sufficient opportunistic capacity is available and other conditions warrant presenting the subscriber with an option to receive the requested content object now without using promised capacity under the subscriber's DAP (e.g., for free or for some discounted price), such that the request can be handled as a "watch now" type of request fulfilled using opportunistic capacity. In some implementations, additional requests are made on behalf of subscribers (particular subscribers, groups of subscribers, etc.) and are considered "implicit" requests 216. As illustrated, the provider-side optimizer 150 can include a recommender subsystem 156, which, among other things, can predict which content objects would likely be of interest to subscribers and can request those objects on behalf of those subscribers.

In some embodiments, the scheduler subsystem 152 and the provider-side storage manager subsystem 154 score the content objects. Turning first to the scheduler subsystem 152, embodiments perform various functions relating to scheduling of the communications links over the provider network 185. For example, implementations of the provider-side system 140 include provider side storage 170 with various types of queues, such as one or more delaycast queues 172 and/or one or more subscriber queues 174. Embodiments of the scheduler subsystem 152 score and categorize content objects to determine into which of the provider side storage 170 queues to schedule the content objects, where in the queues to place the objects (e.g., how to prioritize the queues), etc. Some implementations of the scheduler determinations are made according to network-wide resources, while other implementations of the scheduler determinations are made according to "resource chunks," like individual spot beams, carriers, etc. For example, the scheduler subsystem 152 maintains a scheduler instance 252 for each resource chunk, so each scheduler instance 252 can make resource determinations for its respective chunk of resources.

While implementations of the scheduler subsystem 152 can be used to schedule all link resources (e.g., bandwidth) of the provider network 185 for both opportunistic and non-opportunistic requests, the discussion herein focuses on use of the scheduler subsystem 152 to schedule opportunistic resources and to fulfill opportunistic requests. Requested objects determined to be delayable objects can be placed in the delaycast queue 172 of the provider-side system 140. The scheduler subsystem 152 can calculate and assign scheduler scores 262 for the delayable objects to determine where in the delaycast queue 172 to place the delayable objects (e.g., a priority order). The scheduler scores 262 can be calculated according to a set of (i.e., one or more) link-level scalars. The scalars can be used to generate a multi-dimensional scheduler score 262, a weighted array of factors, or any other suitable score. In some implementations, each delayable content object is composed of one or more sub-objects (e.g., content chunks, byte blocks, etc.), and the scheduler score 262 is calculated according to each sub-object. Each scalar can be implemented as a weighted factor to have a certain magnitude of impact on the overall scheduler score 262. The weighting of each scalar can be fixed, or each scalar can be implemented effectively as a knob that can be tuned to adjust the impact of each scalar on the overall scheduler score 262.

Some such illustrative link-level scalars can relate to a size of the content object. For example, more capacity is involved in communicating larger objects, which can drive different prioritization of that object from the perspective of scheduling the communications link. In some instances, the provider-side system 140 is aware of which portions of a requested delayable object, if any, are already locally cached by the requesting subscriber (e.g., in the subscriber's home CDN 125). In these instances, the scheduler score 262 calculation can be based on a remaining portion of the requested content object left to communicate to the subscriber or subscribers that explicitly requested the content object.

Other such illustrative link-level scalars can relate to a global popularity scalar associated with the content object. For example, request statistics, ratings by subscribers and/or others, and/or other criteria can be used as a measure of the popularity of a requested delayable object, and more popular content can be prioritized above less popular content from the perspective of scheduling the communications link. Related illustrative scalars can relate to a number of requests pending for the delayable content object (e.g., as the number of requests for the same object increase, the object's priority in the delaycast queue 172 increases), a global consumption scalar associated with the content object (e.g., the system can track how often the object is actually viewed by requesting and/or non-requesting subscribers as a measure of how likely it is that the object will be consumed if it is anticipatorily communicated), a global consumption scalar associated with the at least one subscriber-side system 110 that explicitly requested the content object (e.g., the system can track how often the requesting subscriber actually consumes objects that are opportunistically delivered to the requesting subscriber as a measure of how likely it is that the object will be consumed if it is anticipatorily communicated), etc.

Still other such illustrative link-level scalars can relate to a fairness associated with the explicit request for the content object. Implementations of the scheduler subsystem 152 can weight the scheduler scores 262 toward requests by subscribers who have not had as many requests prioritized recently or for different tiers of service, etc. For example, if ten of User A's requests this month have received relatively high scheduler scores 262 (resulting in higher queue priorities, e.g., because User A tends to request popular content, to make requests at off-peak times, or for other reasons), and all of User B's requests this month have received relatively low scheduler scores 262 (resulting in lower queue priorities, e.g., because User B tends to request unpopular content, to make requests during peak busy times, or for other reasons), a new request from User B can be weighted to result in an appreciably higher scheduler score 262 to reflect a certain policy of fairness.

Yet other such illustrative link-level scalars can relate to a promise time associated with the explicit request for the content object. Some implementations of the provider-side system 140 can calculate and/or predict a promise time for delivering the requested content objects. For example, other link-level scalars can be used to place the delayable content objects in appropriate prioritized locations in the delaycast queue 172. This placement (and other factors, such as resource provisioning, network load statistics, etc.) can be used to predict how long it is likely to take before the network is in a state that can support opportunistic delivery of the delayable object. This prediction can then be used to present a promise time to the requesting subscriber and/or other subscribers. For example, if it is calculated that the requested content object can be delivered in seven hours with 95-percent confidence, a promise time of twelve hours can be displayed to the requesting subscriber. As additional delayable content objects are scheduled in the delaycast queue 172, the scheduler scores 262 can be weighted to avoid violating these promise times.

Figure 3A:
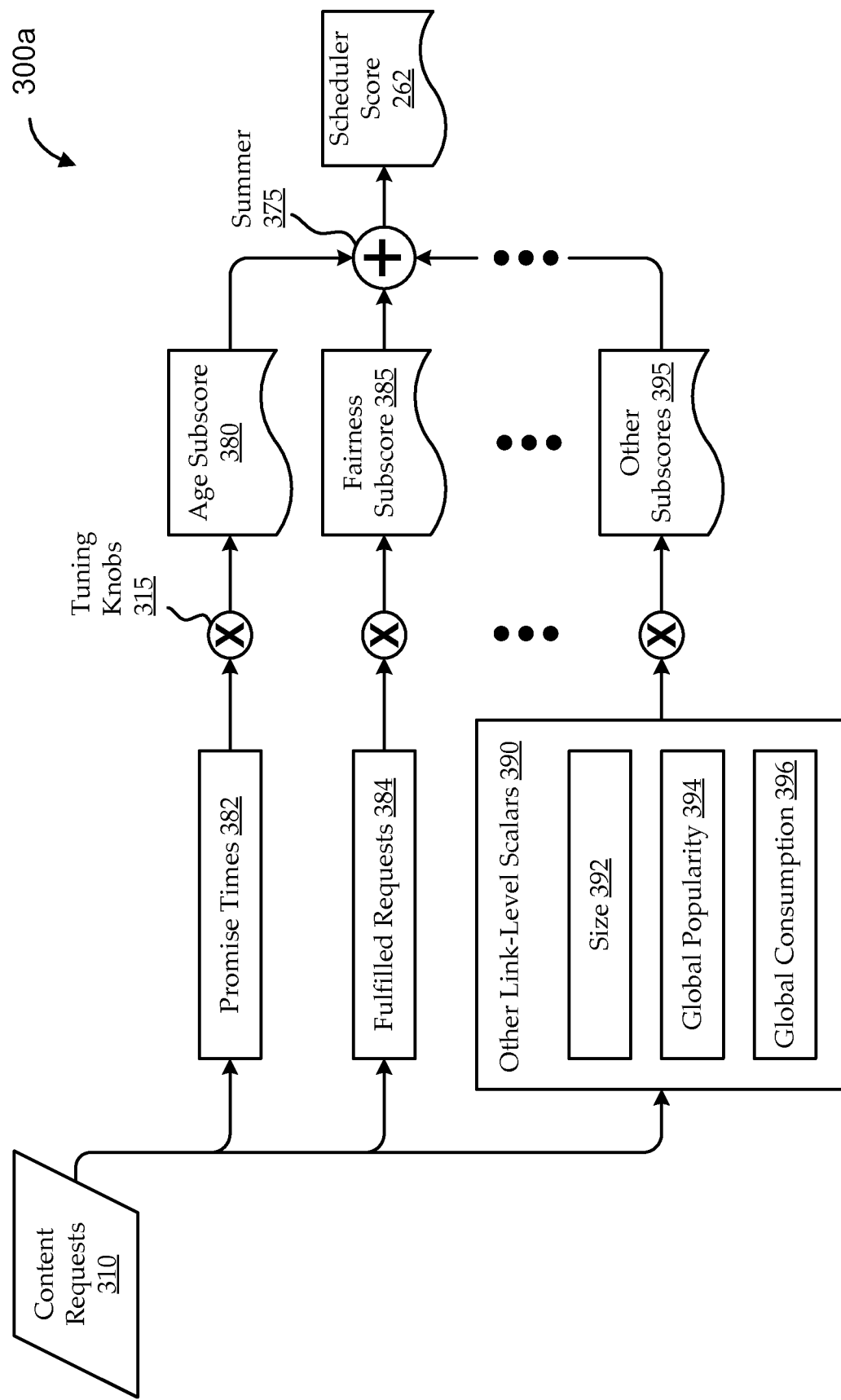
FIG. 3A shows a functional schematic for generation of scheduler scores, according to one embodiment.

For the sake of illustration, FIG. 3A shows a functional schematic 300a for generation of scheduler scores 262, according to one embodiment. A content request 310 is received. For a content object invoked by the content request 310, various link-level scalars are analyzed. For example, promise times 382 are analyzed to determine scheduling the content object 310 in a certain manner will violate its own promise time or promise times associated with other content objects. The promise times 382 (e.g., and/or other request age-related scalars) can have an associated tuning knob 315 (e.g., weighting factor) to determine its impact on an age subscore 380. In one implementation, the age subscore 380 is calculated according to a linear equation (e.g., a multiplier). For example, the tuning knob effectively sets the slope at which the weighting decreases based on age of the request. In another implementation, the age subscore 380 is calculated according to a non-linear function. For example, the weighting of the content object request decreases based on age of the request according to an exponential (e.g., decay) function, a logarithmic function, an exponential (e.g., reciprocal) function, etc. In one embodiment, the age subscore 380 is calculated according to the equation:

$$N_0 e\left(\frac{-t}{T}\right)$$

where $N_0$ is a scalar, t is the age of the request (e.g., queue position, etc.), and T is a rate of decay. For example, if T is 10, the weighting of the tenth "oldest" request is approximately one-half of the weighting for the first "oldest request"). While one tuning knob 315 is shown in association with each scalar and/or score, some implementations can have multiple tuning knobs for a particular scalar. For example, according to the exponential decay function described above, separate tuning knobs 315 can be associated with each of $N_0$, t, and T. Similar linear and/or non-linear weightings can be applied to any of the scalars and scores described herein.

A number of fulfilled requests 384 for the requesting subscriber and/or other subscribers can also be analyzed to determine whether scheduling the content object 310 in a certain manner will have an impact on fairness (e.g., global and/or individual). The number of fulfilled requests 384 (e.g., and/or other fairness-related scalars) can have an associated tuning knob 315 to determine its impact on a fairness subscore 385. Other analyses can be performed with other link-level scalars 390. For example, one or more other subscores 395 can relate to scalars, such as the size 392 of the content object 310, a global popularity metric 394 relating to the content object 310, a global consumption metric 396 relating to the content object 310, etc. As with the other analyses, each scalar has an associated tuning knob 315 to determine its impact on one or more other subscores 395. A combiner 375 can add all the subscores to generate one or more scheduler scores 262 for the content object 310 with respect to the link. In some implementations, the scheduler scores 262 are single scores based on multiple scalars. In other implementations, the scheduler scores 262 are represented as multidimensional scores (e.g., arrays or vectors representing some or all of the scalars).

While FIG. 3A illustrates one illustrative approach for calculating one or more scheduler scores 262, many other approaches are possible according to various embodiments. For example, additional and/or alternative link-level scalars can be included in the calculation with different multipliers, etc. Other approaches can use various types of arithmetic and/or heuristic approaches. For example, artificial neural network approaches can be used with various types of feedback and machine learning, cluster analysis approaches can be used with supporting algorithms (e.g., k-means clustering, expectation-maximization algorithms, etc.), etc. Certain implementations effectively refine a multi-dimensional vector space of content and/or user elements so that similar elements converge (e.g., move closer together, cluster, etc.) in the vector space.

Returning to FIG. 2, in addition to the scheduler subsystem 152 prioritizing delayable content objects in the delay-cast queue 172, embodiments of the provider-side storage manager subsystem 154 determine whether subscribers are likely to engage with those content objects if opportunistically delivered to those subscribers. In some implementations, these determinations are made at the "subscriber cluster" level, and the provider-side storage manager subsystem 154 can include a provider-side storage manager instance 254 for each subscriber cluster. As used herein, each single subscriber, or groups of subscribers, can be considered as a subscriber cluster that has associated characteristics, such as preferences, consumption history, device capabilities, etc. In some implementations, each subscriber is treated as a "cluster of one." In other implementations, a single subscriber can be part of multiple subscriber clusters. For example, a subscriber can be in a first cluster of subscribers that enjoy fantasy movies, and in a second cluster of subscribers that view media on a particular device type. In still other implementations, subscriber clusters can overlap, subsume, and/or otherwise interact with each other. For example, a subscriber can be in a first cluster of subscribers tuned to the same polarization of the same carrier of the same spot beam of the same satellite, and in a sub-cluster (within the first cluster) of subscribers having a certain subscription tier.

Embodiments of the provider-side storage manager subsystem 154 use various techniques to predict (and/or record) subscriber engagement with content objects. As used herein, "subscriber engagement" generally refers to a subscriber's (or a subscriber cluster's) interaction on one or more levels with a particular content object. A subscriber can engage with a content object at different levels, for example, by hovering over the object with a pointer device without selecting the object, by selecting the object without requesting the object (e.g., selecting the object to receive more information, like selecting a movie listing on a webpage to receive a more detailed description, a trailer, etc.), by requesting substantially real-time delivery of the object (e.g., by download, streaming, etc.), by requesting delayed delivery of the object without consuming (e.g., watching) the object, by consuming the object after it is opportunistically delivered, etc. Subscriber engagement can be considered a gauge of subscriber satisfaction or happiness. For example, a subscriber desires to have access to any content of interest at any time. Accordingly, the provider-side storage manager subsystem 154 can seek to maximize subscriber engagement, for example, by modeling subscribers' home CDNs 125 and determining how to fill home CDNs 125 with content objects having the highest likelihood of engagement by their respective subscribers.

Implementations of the provider-side storage manager subsystem 154 can calculate and assign storage scores 264 for the delayable content objects based on one or more subscriber cluster-level characteristics to reflect a likelihood of subscriber engagement. For example, each delayable content object is associated with one or more multi-dimensional storage scores 264 for each subscriber cluster that reflects a likelihood that the subscriber cluster will engage with (e.g., consume, view, etc.) the content object if it is opportunistically delivered to that subscriber cluster. In some implementations, storage scores 264 are calculated for all requested content objects and/or for all content objects locally stored in subscribers' home CDNs 125. These storage scores 264 can be used by provider-side and or subscriber-side functions to determine whether a particular content object should be locally stored by a particular subscriber (e.g., at the expense of previously stored data, assuming a steady-state scenario in which a subscriber's local cache is full). As with the scheduler scores 262, some implementations calculate storage scores 264 according to sub-objects that compose the content objects, and some implementations use fixed and/or tunable weightings of the storage scalars to determine the impact of each scalar on the overall storage scores 264.

Some such storage scalars relate to characteristics of the subscriber or subscriber cluster. One illustrative storage scalar of this type relates to subscriber profile information. Implementations can keep track of many types of information about subscribers, including, for example, at the individual subscriber or subscriber group level; information provided by the subscribers (e.g., as part of a registration process), collected by monitoring subscriber activity on the network, or received from third-party services (e.g., credit reporting agencies, social networking sites, etc.); etc. For example, a subscriber's storage scores 264 for content objects can reflect a preference by the subscriber for a certain genre, actor, director, time period, domain, subscription service, feed, etc. Another illustrative storage scalar of this type gives preference to content objects that are more compatible with a subscriber's interaction device. For example, if the subscriber is likely to consume the content object via a high-definition television set versus a small mobile device screen, a particular format of a particular requested object can be more or less desirable. Yet other storage scalars of this type relate to subscriber engagement patterns, like interactivity and/or consumption (e.g., a subscriber's behavior with regard to hovering over, clicking on, viewing, and/or otherwise engaging with content objects). For example, a subscriber's tendency to request objects of a certain type and never actually consume those objects can cause objects of that type to be scored lower for that subscriber.

Other such illustrative storage scalars relate to a size of the content object. For example, more capacity is involved in locally caching larger objects, which can impact whether the object should be locally cached at the expense of having to push other objects out of the local cache (e.g., where cache capacity is limited). This scalar can be adjusted to account for portions of the content object already stored in the subscriber's cache. This scalar can also be adjusted based on other characteristics of objects presently stored in the subscriber's cache. For example, a storage staleness scalar can be used to weight cache contents in favor of less stale content objects, such as more recently cached content objects or content objects having longer relevance (e.g., a popular movie can have longer lasting relevance than a new clip).

Still other such storage scalars can relate to popularity. One illustrative scalar of this type is a global popularity scalar associated with the content object. For example, it can be assumed in certain implementations that any subscriber is more likely to engage with content objects that are a more globally popular. Another illustrative scalar of this type is a subscriber cluster popularity scalar associated with the content object. For example, the content object can be scored higher if the content object is popular among other subscribers in a cluster, determined to be popular for a cluster based on engagement patterns (e.g., the request is for an episode of a television program, and the subscriber cluster has tended to consume past episodes of the program), etc.

Figure 3B:
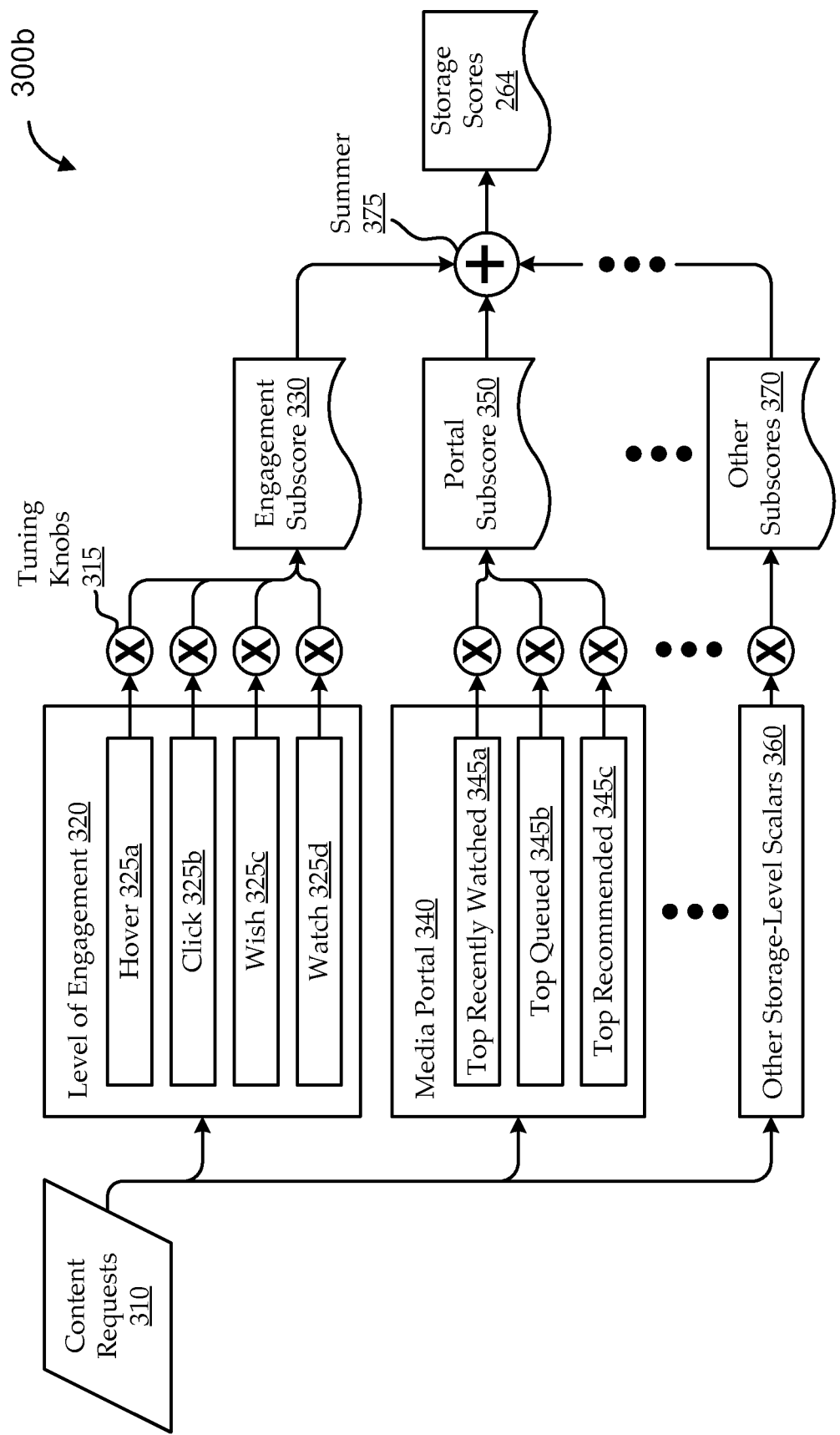
FIG. 3B shows a functional schematic for generation of storage scores, according to one embodiment.

For the sake of illustration, FIG. 3B shows a functional schematic 300b for generation of storage scores 264, according to one embodiment. A content request 310 is received. For a content object invoked by the content request 310, a level of engagement analysis 320 is performed to determine whether there was a hover 325a (e.g., a mouse-over), a click 325b (e.g., a selection of an icon to receive more information about the object or to make an initial request for the object), a wish 325c (e.g., an explicit opting by the user for opportunistically delayed delivery of the object), or a watch 325d (e.g., an explicit opting by the user for substantially real-time delivery of the object) type of engagement. Each level of engagement has an associated tuning knob 315 (e.g., weighting factor) to determine its impact on an engagement subscore 330. For example, a hover 325a receives a multiple of '1', while a watch 325d receives a multiple of '8', so that the subscriber's opting to watch 325d the object appreciably increases its storage score 264 for that subscriber.

A media portal analysis 340 can also be performed on the content object to determine how this content object fits in with other content engagement through one or more media portals (e.g., a movie streaming or download site). For example, a determination is made as to whether the content object is one of the top ten recently watched objects on the portal 345a, one of the top ten objects queued by the subscriber on the portal 345b, one of the top 25 objects recommended to the subscriber by the portal 345c, etc. Each level of relationship of the content object to the media portal has an associated tuning knob 315 to determine its impact on a portal subscore 350. For example, a multiplier of '4' is applied when the content object is one of the top ten recently watched objects on the portal 345a, while a multiplier of '1' is applied when the content object is one of the top 25 objects recommended to the subscriber by the portal 345c.

Other analyses can be performed with other storage-level scalars 360. As with the engagement and media portal analyses, each scalar has an associated tuning knob 315 to determine its impact on other subscores 370. A combiner 375 can add all the subscores to generate one or more storage scores 264 for the content object with respect to one or more subscribers (e.g., the subscriber cluster). In some implementations, the storage scores 264 are single scores based on multiple scalars. In other implementations, the storage scores 264 are represented as multidimensional scores (e.g., arrays or vectors representing some or all of the scalars).

While FIGS. 3A and 3B each illustrates one illustrative approach for calculating one or more scores, many other approaches are possible according to various embodiments. For example, additional and/or alternative scalars can be included in the calculation with different multipliers, etc. Other approaches can use various types of arithmetic and/or heuristic approaches. For example, artificial neural network approaches can be used with various types of feedback and machine learning, cluster analysis approaches can be used with supporting algorithms (e.g., k-means clustering, expectation-maximization algorithms, etc.), etc. Certain implementations effectively refine a multi-dimensional vector space of content and/or user elements so that similar elements converge (e.g., move closer together, cluster, etc.) in the vector space.

Returning to FIG. 2, for opportunistic requests and their associated delayable content objects, those content objects 222 are scheduled in the delaycast queue 172 and are associated with respective scheduler scores 262 and storage scores 264. The content objects 222 in the delaycast queue can be prioritized according to the scheduler scores 262, and the content objects 222 can be associated with control data 224 relating to the storage scores 264. In some implementations, the control data 224 includes the storage scores 264 themselves or information derived from the storage scores 264. The control data 224 can then be sent to the subscriber-side systems 110 in such a way that those systems can determine whether to store the content objects 222 when they are received. For example, when a subscriber-side system 110 receives a content object 222 with control data 224 that includes the storage scores 264, the received storage scores 264 can be compared to storage scores 264 of other content objects already stored in the local cache (e.g., the home CDN 125) to determine whether to store the received content object (e.g., according to how likely the subscriber is to engage in the received content object relative to previously cached content objects). In other implementations, the provider-side system 140 maintains models of subscriber caches, and storage scores 264 are used at the provider side (e.g., by the provider-side storage manager subsystem 154) to determine whether subscribers should store the content objects. In some such implementations, directives are communicated to the subscriber-side systems 110 directing them to store or ignore the content objects as they are opportunistically received.

For non-opportunistic requests and their respective non-delayable content objects, implementations of the scheduler subsystem 152 can queue those requested content objects in subscriber queues 174. While these requested objects are considered as non-delayable content objects, certain embodiments of the provider-side storage manager subsystem 154 calculate storage scores 264 for these requested objects. Those storage scores 264 can help determine whether other objects, including later-requested delayable objects should be stored in subscriber caches.

Embodiments of the provider-side communications subsystem 180 communicate queued content objects from the one or more delaycast queues 172 and from the subscriber queues 174 to the subscriber-side systems 110 over the provider network 185. In various implementations, the provider-side communications subsystem 180 performs various functions to support communications of the content objects, including further scheduling of the communications links, protocol handling (e.g., handling of multicast and unicast service flows, packetizing protocols, etc.), coding and/or modulation, etc.

The functionality of these and/or other embodiments can be implemented in many ways without departing from the scope of embodiments. Some embodiments are implemented in systems, like the ones described above with reference to FIGS. 1 and 2. Other embodiments are implemented in systems, such as those described below with reference to FIGS. 4-6.

Figure 4:
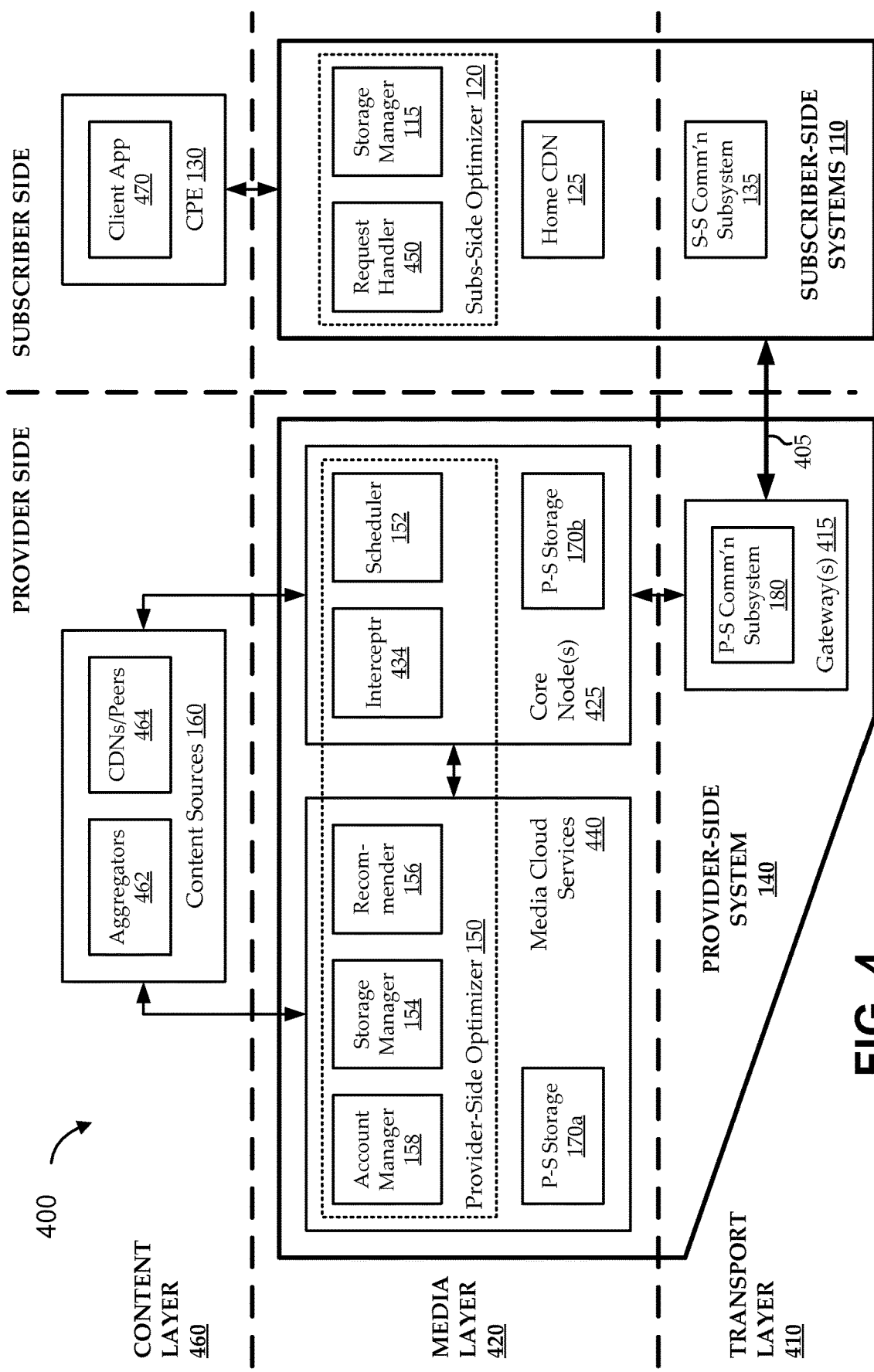
FIG. 4 shows a simplified block diagram of an illustrative communications architecture in which a provider system is in communication with content sources and subscriber systems, according to various embodiments.

FIG. 4 shows a simplified block diagram of an illustrative communications architecture 400 in which a provider system 140 is in communication with content sources 160 and subscriber systems 110, according to various embodiments. Certain elements of FIG. 4 are numbered to correspond to elements of FIG. 1; though those elements of FIG. 4 are intended only as illustrative embodiments, and should not be construed as limiting the scope of corresponding elements of FIG. 1. The communications infrastructure 400 is illustrated as having a provider side and a subscriber side, and can be implemented as a client-server architecture or any other suitable architecture. The functionality can also be considered as operating at a transport layer 410, a media layer 420, and a content layer 460. These layers are not intended to match traditional layers of the Open Systems Interconnection (OSI) model or another standard protocol or the like. Rather, the layers are intended only to provide a general categorization of functionality for added clarity and should not be construed as limiting the scope of embodiments. Embodiments of the content layer 460 generally include components for providing content data. Embodiments of the media layer 420 generally include components for determining how to handle the content data with regard to providing media and related services to subscribers. Embodiments of the transport layer 410 generally include components for handling transport of data between the provider system 140 and subscriber systems 110 at least in support of the provided media and related services.

As illustrated, content can be communicated from one or more content sources 160 to one or more end-user devices (shown as CPE(s) 130). For example, a content request can be initiated by a CPE 130 and interpreted by an associated subscriber-side system 110 for communication over the satellite communications environment 400. The subscriber-side system 110 communicates the request to a provider-side system 140 over a communications infrastructure (represented by link 405, for example, the provider network 185 of FIG. 1). The provider-side system 140 can then attempt to fulfill the content request by requesting and receiving content from one or more content sources 160. In an alternate use case, content can be requested by the provider-side system 140 (e.g., by a recommendation or other function on behalf of or not on behalf of subscriber-side systems 110), for example, for anticipatory pre-pushing of content. In another alternate use case, content can be pushed from one or more content sources 160 and/or server system 142 to one or more subscriber systems 110.

Turning first to the provider-side system 140 functionality, embodiments provide and handle media and related services with subscriber systems 110 over an infrastructure illustrated by link 405. The link 405 can represent a satellite communications infrastructure or any other bandwidth-limited infrastructure in which forward link sharing can be exploited (e.g., through multicasting or the like, including in some embodiments Wi-Fi, WiMAX, and DOCSIS Internet access systems). The provider-side system 140 is illustrated as a distributed architecture, with functionality spread between gateways 415, core nodes 425, and media cloud services 440. In one illustrative embodiment, gateways 415 are geographically distributed, and each includes one or more base stations for handling communications over one or more spot beams and/or carriers. Each of multiple gateways 415 feeds into one or more core nodes 425 of a backhaul network. Each core node 425 can then have high-bandwidth, high-reliability connections to the Internet, allowing effective implementation of certain services in the "cloud" (e.g., multiple distributed servers in communication over the Internet), illustrated as media cloud services 440.

It can be desirable to move certain types of functionality upstream. For example, size, servicing, and/or other features can limit the practical amount of processing available in downstream components, such as base stations and gateways 415. Accordingly, it can be more practical to move resource-intensive processing functions to core nodes 425 and/or to the media cloud services 440. Additionally, certain types of determinations can be made better when more information is available from across larger segments of the network. For example, determinations of content popularity can benefit from information gathered across multiple carriers on multiple spot beams. This type of information can be more readily available to components that are further upstream, such that performance of related functionality by upstream devices can be beneficial in certain cases.

In the illustrated embodiment, the transport layer 410 of the provider-side system 140 includes one or more gateways 415 that implement a provider-side communications subsystem 180. The media layer 420 of the provider-side system 140 includes core nodes 425 and media cloud services 440 that implement provider-side optimizer 150 functions and provider-side storage 170 functions (e.g., one or more delaycast queues 172 and subscriber queues 174, as described with reference to FIGS. 1 and 2). The provider-side optimizer 150 functions can include a scheduler subsystem 152 and an interceptor 434 implemented in the core nodes 425, and a provider-side storage manager subsystem 154, a recommender subsystem 156, and an account manager 158 implemented as media cloud services 440. The content layer 460 (which can be part of and/or separate from the provider-side system 140) includes one or more content sources 160, like aggregators 462 and content distribution networks (CDNs) or peers 464.

For the above and/or other reasons, it can be desirable to implement functionality described herein in context of distributed architectures, like the one illustrated in FIG. 4. However, many alternative architectures are possible. For example, it can be desirable in certain contexts to push some or all of the functionality shown in the media layer 420 into components of a gateway 415 or other device. Alternatively, embodiments implement substantially all the functionality using media cloud services 440 in direct communication with a gateway 415 or other transport layer 410 component. Accordingly, functionality described herein should not be construed as relying on a particular architecture, except where indicated.

As illustrated, the provider-side system 140 interfaces with subscriber-side systems 110 via at least a provider-side communications subsystem 180, a link 405, and a subscriber-side communications subsystem 135. These components perform any suitable transport-layer functions depending on the types of communications supported, including those described above with reference to FIGS. 1 and 2. For example, in context of a satellite communications architecture, transport-layer functions can include encoding (e.g., adaptively), decoding, modulating (e.g., adaptively), demodulating, applying or processing error correction techniques, baseband encapsulating, frame creation, etc. (e.g., using various modcodes, lookup tables, etc.). Other functions can include upconverting, amplifying, filtering, tuning, tracking, etc. Further, the various subsystems can include any suitable components, such as gateways, base stations, antennas, satellite modem termination systems (SMTSs), etc.

Various types of information (e.g., content objects, content requests, etc.) can be communicated between the provider-side system 140 and the subscriber-side systems 110 via the provider-side communications subsystem 180 and/or between the provider-side system 140 and content sources 160 via content layer 460 functions. Some or all of these communications pass through one or more functions of the provider-side optimizer 150 for media-layer handling. In some implementations, all media-layer handling occurs in media layer 420 functions of the provider-side system 140 and the subscriber-side systems 110, including by the provider-side optimizer 150 and the subscriber-side optimizer 120. In other implementations, additional media layer handling can be performed by other components. Various techniques for performing certain media layer 420 and related functions (e.g., for identifying content as "cacheable" (or "non-cacheable") and/or "delayable" (or "non-delayable"), identifying requests as opportunistic or non-opportunistic, identifying and exploiting time- and demand-shifting opportunities, etc.) are described in U.S. patent application Ser. No. 13/569,811, filed on Aug. 8, 2012, titled "OPPORTUNISTICALLY DELAYED DELIVERY IN A SATELLITE NETWORK," which is hereby incorporated by reference in its entirety.

The architecture 400 described above is one of many possible architectures for performing the functions described herein. For example, each component can be implemented in different ways, including using one or more components, hardware and/or software, custom and/or off-the-shelf components, etc. Accordingly, though embodiments are described herein with reference to particular components providing particular functionality as part of particular subsystems, similar functionality can be provided in other ways (e.g. by other components and/or at other locations in the architecture) without departing from the scope of embodiments. Further, though some components are similarly named in the provider-side system 140 and the subscriber-side systems 110, the similarity in names is intended only to add clarity and simplicity to the disclosure and not to imply that the components are implemented identically or perform identical functionality. Even further, the provider-side system 140 and the subscriber-side systems 110 can perform many other types of functionality and/or can include other components not discussed above.

Figure 5:
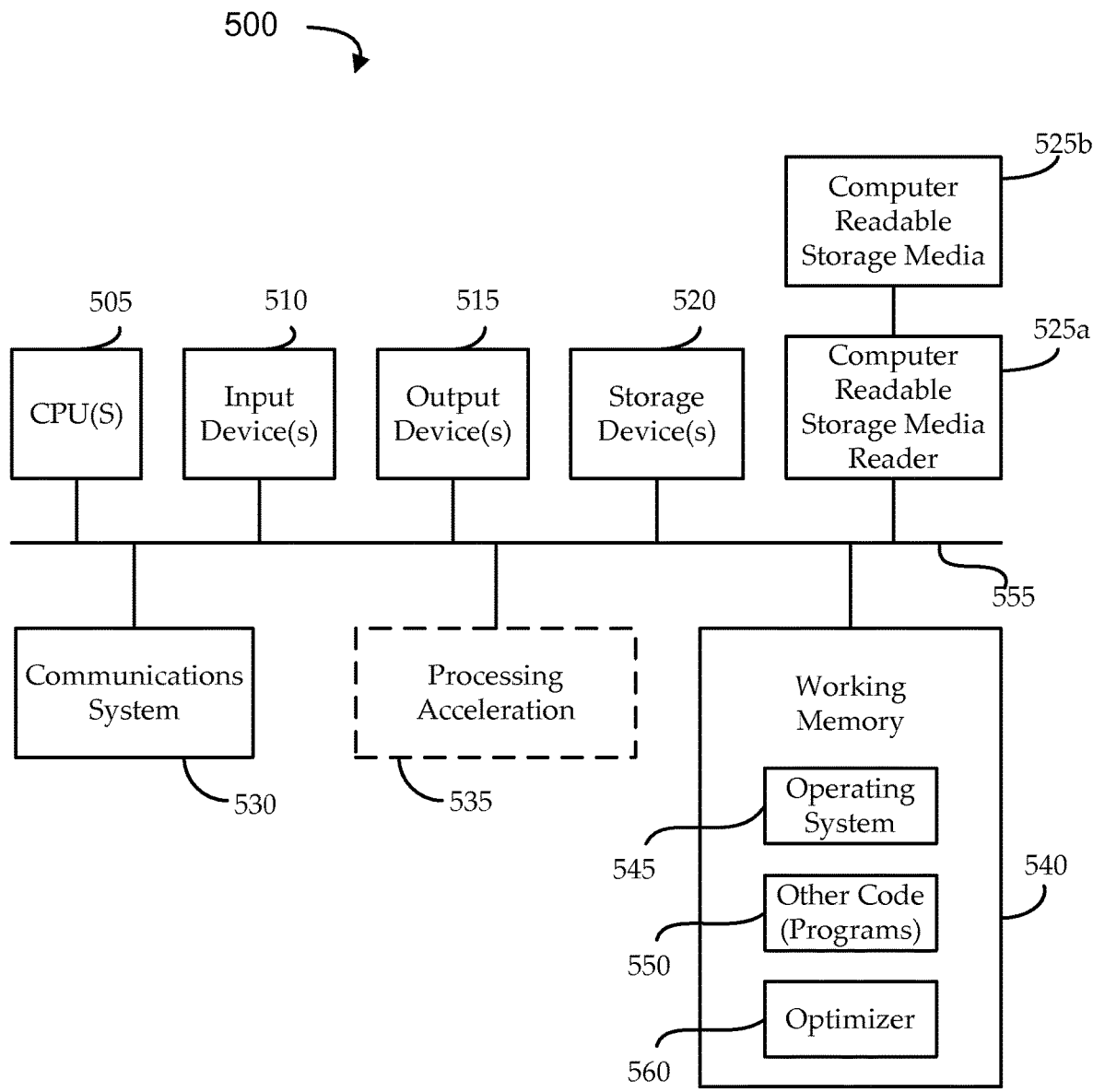
FIG. 5 shows an illustrative computational system for implementing functionality of optimizers, according to various embodiments.

FIG. 5 shows an illustrative computational system 500 for implementing functionality of optimizers, according to various embodiments. The computational system 500 can include or perform functionality of components of provider-side optimizer 150 or subscriber-side optimizer 120 embodiments, such as those described above in FIGS. 1, 2, and 4. For the sake of simplicity, the computational system 500 is shown including hardware elements that can be electrically coupled via a bus 555. However, embodiments of the computational system 500 can be implemented as or embodied in single or distributed computer systems, in one or more locations, or in any other useful way.

The hardware elements can include one or more central processing units (CPUs) 505, one or more input devices 510 (e.g., a mouse, a keyboard, etc.), and one or more output devices 515 (e.g., a display device, a printer, etc.). The computational system 500 can also include one or more storage devices 520. By way of example, storage device(s) 520 can be disk drives, optical storage devices, solid-state storage device such as a random access memory (RAM) and/or a read-only memory (ROM), which can be programmable, flash-updateable and/or the like. In some embodiments, the storage devices 520 include or are in communication with the home CDN 125 of the subscriber system 110, as described above.

The computational system 500 can additionally include a computer-readable storage media reader 525a, a communications system 530 (e.g., a modem, a network card (wireless or wired), an infra-red communication device, etc.), and working memory 540, which can include RAM and ROM devices as described above. In some embodiments, the computational system 500 can also include a processing acceleration unit 535, which can include a DSP, a special-purpose processor and/or the like.

The computer-readable storage media reader 525a can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information. In some embodiments, the home CDN 125 is implemented, in whole or in part, as computer-readable storage media 525b. The communications system 530 can permit data to be exchanged with a network and/or any other computer described above with respect to the computational system 500. For example, as described with reference to FIGS. 1, 2, and 4, content traffic and/or other information can be communicated via a provider network 185 or other communications link 405 to the home CDN 125, one or more CPEs 130, or other subscriber- or provider-side components.

The computational system 500 can also include software elements, shown as being currently located within a working memory 540, including an operating system 545 and/or other code 550, such as an application program (which can be a client application, web browser, mid-tier application, relational database management system (RDBMS), etc.). In some embodiments, one or more functions of the subscriber-side optimizers 120 or provider-side optimizers 150 are implemented as application code 550 in working memory 540. For example, functionality of the scheduler subsystem 152, the provider-side storage manager subsystem 154, the recommender subsystem 156, the account manager subsystem 158, the subscriber-side storage manager subsystem 115, etc. can be implemented as code of the working memory 540 (e.g., as part of the other code 550).

Figure 6:
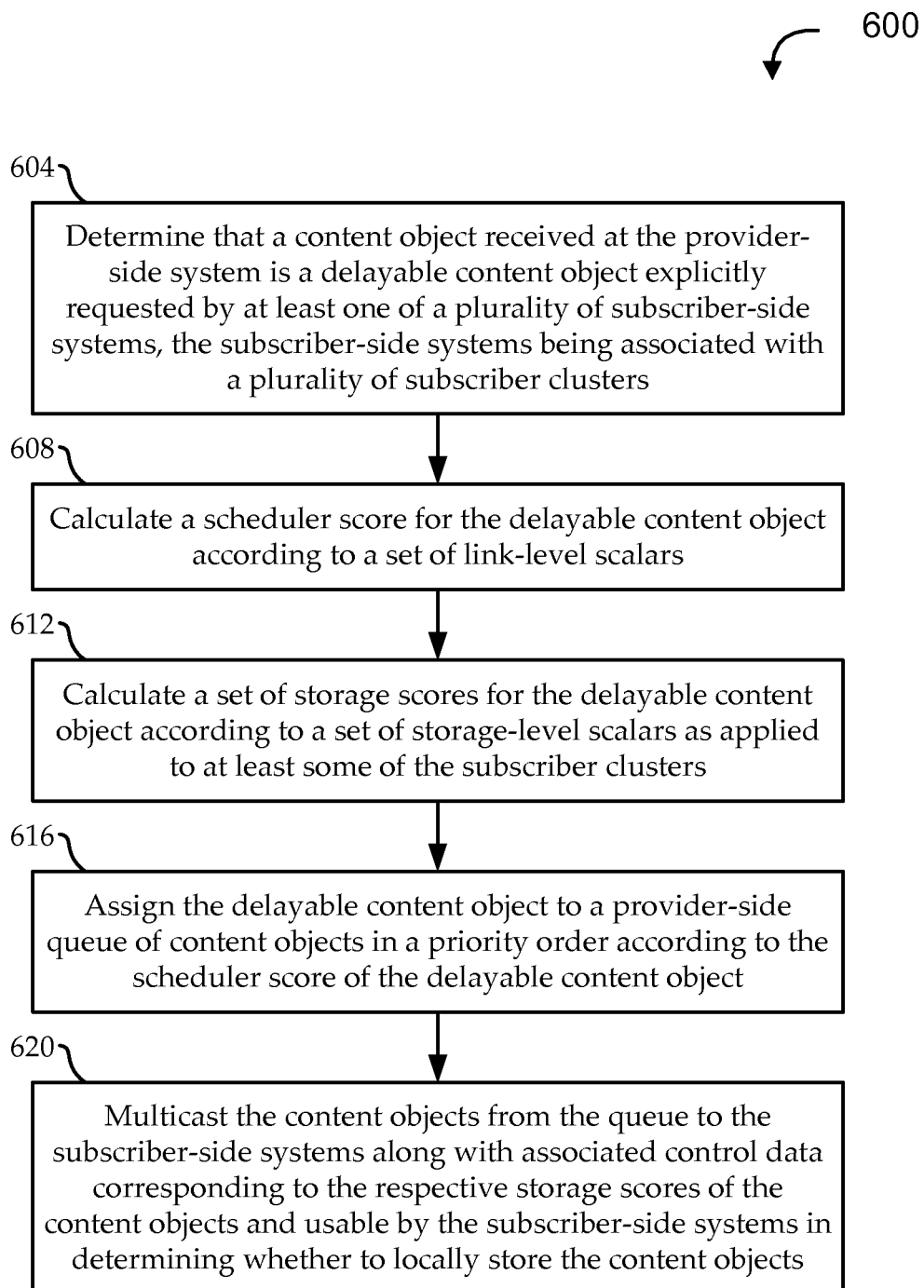
FIG. 6 shows a flow diagram of an illustrative method for subscriber-driven resource shifting, according to various embodiments.

Turning to FIG. 6, a flow diagram is shown of an illustrative method 600 for subscriber-driven resource shifting, according to various embodiments. The method 600 is described in context of a provider-side system operating within a communications infrastructure, for example, like the provider-side systems 110 described above with reference to FIGS. 1-5. The same or similar techniques can be applied to any type of provider-side system that operates within a communications infrastructure configured to provide the functions described herein.

Embodiments of the method 600 begin at stage 604 by determining that a content object received at the provider-side system is a delayable content object explicitly requested by at least one of a number of subscriber-side systems. As described above, different types of requests can be received by the provider-side system, including some that are opportunistic requests relating to one or more delayable content objects. Determining that a content object is a delayable content object can effectively be a determination that opportunistic capacity can be used (e.g., now or later, depending on characteristics of the request) to deliver the content object to one or more subscriber-side systems. In some embodiments, only explicitly delayed content objects are determined to be delayable (e.g., not content objects requested by a recommender or other non-subscriber). In other embodiments, the content object is determined to be a delayable content object when the request for the content object indicates an explicit request to opportunistically delay delivery of the content object. For example, the subscriber is presented with an option to delay receipt of the requested content object for some time in exchange for a discount, and the request indicated that the subscriber has explicitly elected that option.

At stage 608, the provider-side system can calculate a scheduler score for the delayable content object according to a set of link-level scalars. For example, the set of link-level scalars can relate to any one or more of a size of the content object, a global popularity associated with the content object, an amount of the content object left to communicate to the requesting subscriber-side system, a fairness associated with the request for the content object, a number of requests pending for the content object, a promise time associated with the content object, a global consumption scalar associated with the content object, a global consumption scalar associated with the requesting subscriber-side system, etc. In some implementations, the delayable content objects include one or more content chunks (e.g., sub-objects, blocks of byte sequences, etc.), and the scheduler score are calculated based on one or more of the content chunks.

In some implementations, the communications infrastructure includes discrete resource chunks, like spot beams, carriers, etc. In those implementations, the provider-side system can include a scheduler subsystem that has a scheduler instance associated with each resource chunk, so that each scheduler instance can calculate a scheduler score for its respective resource chunk. This can involve applying the set of link-level scalars only to its associated resource chunk or to its resource chunk in context of characteristics of other resource chunks. For example, it can be useful to determine certain scalars (e.g., relating to object size) in context of each individual resource chunk, while it can be useful to determine other scalars (e.g., global popularity) across multiple resource chunks.

At stage 612, the provider-side system can calculate a set of (i.e., one or more) storage scores for the delayable content object according to a set of storage-level scalars as applied to subscriber clusters. For example, the storage-level scalars can relate to any one or more of a size of the content object, a global popularity associated with the content object, a cluster popularity associated with the content object and the subscriber, a storage staleness, a subscriber device compatibility, a subscriber profile compatibility, a subscriber interaction associated with at least one subscriber-side system, a subscriber consumption associated with at least one subscriber-side system associated, etc. In some implementations, the delayable content objects include one or more content chunks, and the storage scores are calculated based on one or more of the content chunks.

In some implementations, some or all storage scores are calculated by applying the storage scalars to subscriber clusters. A subscriber can belong to one or more subscriber clusters, and each subscriber cluster can include one or more subscribers. In one implementation, each subscriber is treated as its own "cluster of one." Embodiments of the provider-side system include a storage manager subsystem having a storage manager instance associated with each subscriber cluster, and each storage manager instance calculates the set of storage scores for each content object according to the set of storage-level scalars as applied to its associated subscriber cluster.

At stage 616, the delayable content object can be assigned to a provider-side queue of content objects in a priority order according to the scheduler score of the delayable content object. For example, the provider-side system includes one or more delaycast queues for scheduling of delayable objects in fulfillment of opportunistic requests. Objects can be added to a delaycast queue in a position (i.e., a priority order) determined by its scheduler score in relation to other scheduler scores of other objects in the delaycast queue. In some implementations, separate delaycast queues are used for scheduling separate resource chunks (e.g., a separate delaycast queue for each carrier of each spot beam).

At stage 620, content objects can be multicast from the queue to the subscriber-side systems along with associated control data. The control data corresponds to the respective storage scores of the content objects and is usable by the subscriber-side systems in determining whether to locally store the content objects (e.g., as they are opportunistically received). For example, a first subscriber requests a content object, which is determined to be delayable and scheduled for delivery via the delaycast queue. When the object is communicated from the queue, it is multicast to the requesting subscriber and a number of other, non-requesting subscribers. For example, in a satellite communications system, any communication of the requested content object effectively broadcasts the content object to any subscriber systems having antennas pointing at the appropriate beam and tuned to the appropriate carrier frequency. When the subscriber system receives the object as part of a multicast communication (e.g., not a private unicast IP transaction), it can use the associated control data to determine whether to store the received object or to ignore the received object.

Figure 7:
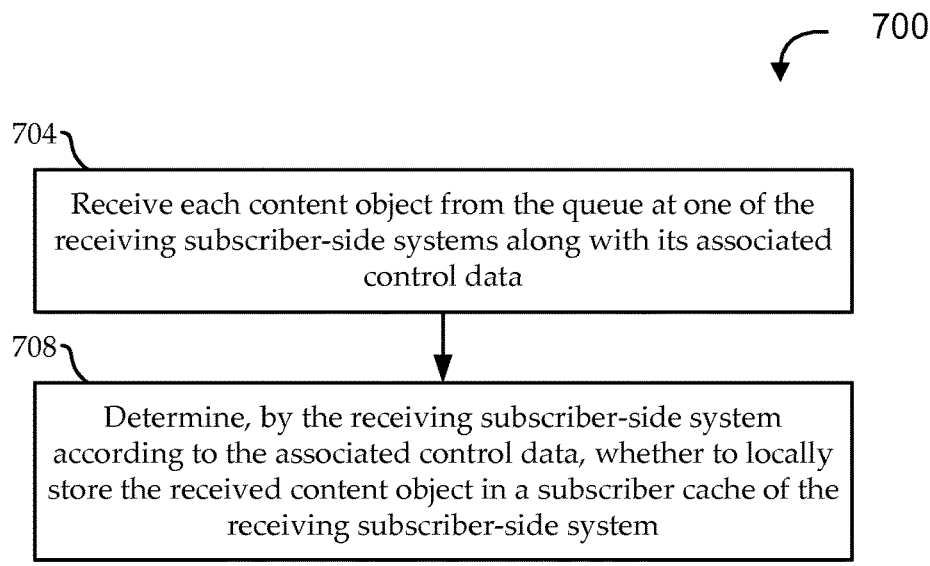
FIG. 7 shows a flow diagram of an illustrative method for handling the opportunistically received content object at a subscriber-side system, according to various embodiments.

FIG. 7 shows a flow diagram of an illustrative method 700 for handling the opportunistically received content object at a subscriber-side system, according to various embodiments. At stage 704, each content object is received from the queue at one of the subscriber-side systems along with its associated control data. In some implementations, the control data is received as part of the content object data (e.g., in a protocol-defined packet format). In other implementations, the control data is received along with the content object data, for example, in the same service flow, channel, etc. In still other implementations, the control data is received separate from, but in association with, the content object data, for example, on a separate control channel, asynchronously, etc.

Figure 8A:
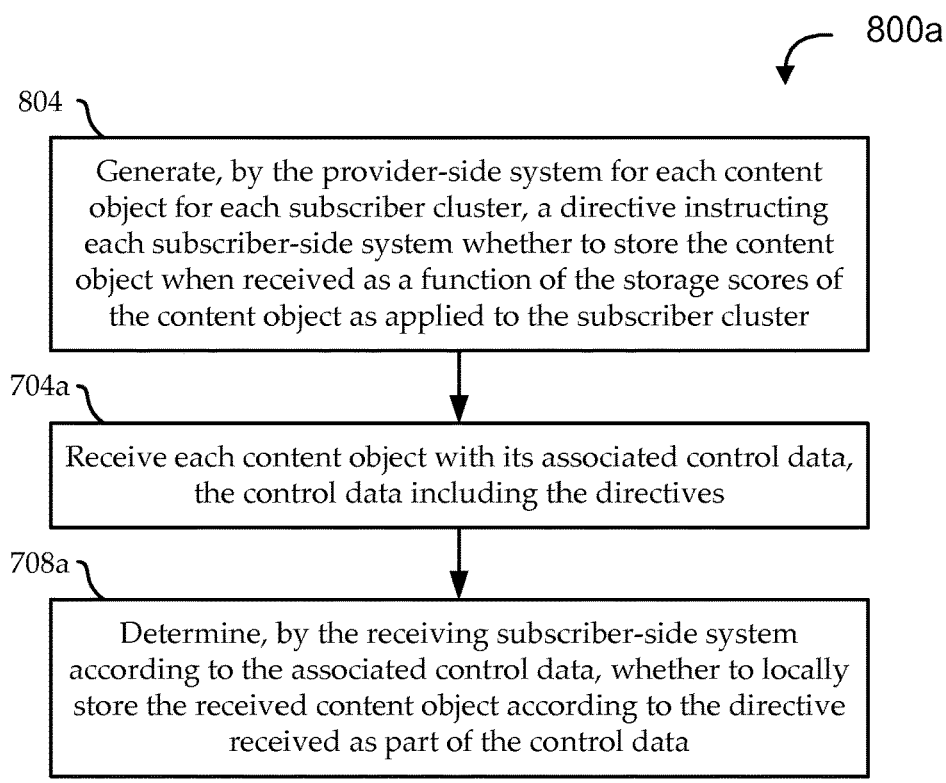
FIG. 8A shows a flow diagram of one illustrative method for using the control data to determine whether to store the content objects at receiving subscriber-side systems.
Figure 8B:
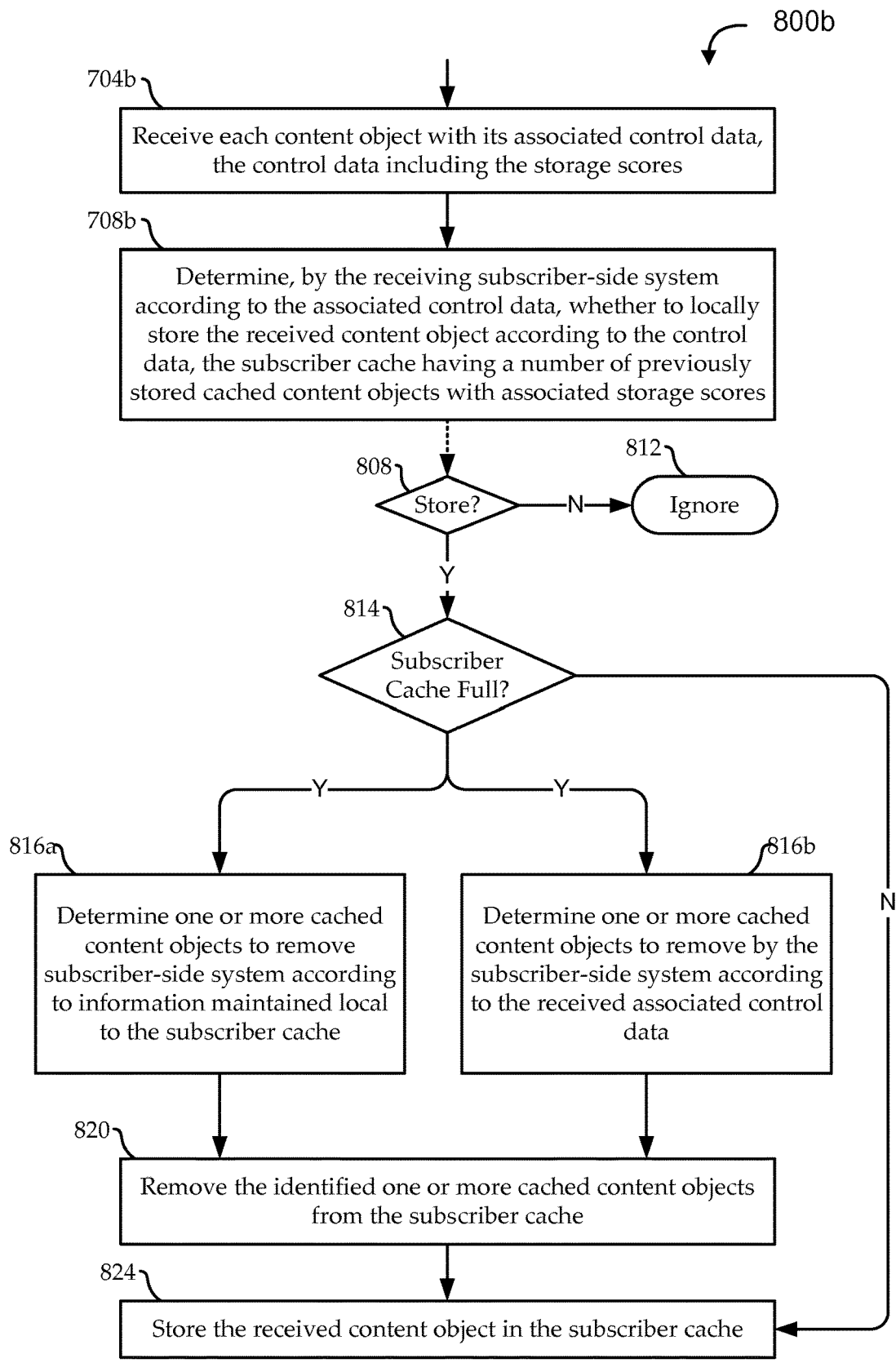
FIG. 8B shows a flow diagram of another illustrative method for using the control data to determine whether to store the content objects at receiving subscriber-side systems.

At stage 708, the receiving subscriber-side system can determine whether to locally store the received content object in a subscriber cache of the receiving subscriber-side system according to the associated control data. For example, the subscriber-side system includes a home CDN, and determines from the control data, whether to ignore the received content object or to store the object in the home CDN. Different embodiments handle the control data differently at either or both of the provider and subscriber sides. FIGS. 8A and 8B illustrate some of those embodiments.

FIG. 8A shows a flow diagram of one illustrative method 800a for using the control data to determine whether to store the content objects at receiving subscriber-side systems. The method 800a represents one implementation of the method 700 of FIG. 7. At stage 804, the provider-side system generates a directive for each content object for each subscriber cluster. For example, a model of each subscriber's cache is stored at the provider-side system, and the directive is generated according to the storage scores of the content object in context of present cache contents as modeled. The directive instructs each subscriber-side system whether to store the content object when received as a function of the object's storage scores as applied to the subscriber cluster of the subscriber-side system. For example, the directive can include a flag, instruction, or any other suitable information that can be interpreted by the subscriber-side system as a direction or suggestion to store the received content object.

The method 800a continues with the stages of method 700 of FIG. 7 in context of the generated directive. At stage 704a, each content object is received from the queue at one of the subscriber-side systems along with an associated directive (as part of the associated control data). At stage 708a, the receiving subscriber-side system can follow the directive to determine whether to locally store the received content object in its subscriber cache. For example, the directive can include an explicit instruction causing the subscriber-side system to store the received content object.

FIG. 8B shows a flow diagram of another illustrative method 800b for using the control data to determine whether to store the content objects at receiving subscriber-side systems. The method 800b represents another implementation of the method 700 of FIG. 7, and includes stages of method 700 of FIG. 7 in context of control data that includes the storage scores. At stage 704b, each content object is received from the queue at one of the subscriber-side systems along with some or all storage scores associated with the content object (as part of the associated control data). For example, the received storage score can be a single value, a multi-dimensional score, a set of scores, etc. At stage 708b, the receiving subscriber-side system can determine whether to locally store the received content object in its subscriber cache according to the received storage score or scores. In one implementation, the received storage scores are used to generate directives in a similar or identical manner to how directives are generated by the provider-side system in embodiments, like those described with reference to FIG. 8A.

In some embodiments, a steady-state condition of the subscriber cache is that the cache is filled with previously received objects, and those objects are replaced with "better" objects as they are received. A content object can be considered "better," for example, when an associated subscriber is more likely to engage with that content object. Accordingly, in certain implementations, the received storage scores are compared to similar scores of other content objects presently stored in the subscriber cache. Determining whether to store the received content object can essentially involve a determination of whether the subscriber is more likely to engage with the newly received content object than with any other content object presently stored in the subscriber cache. If so, it is considered worth removing one or more cached content objects to make room for the newly received content object.

In some embodiments, the method 800b continues at stage 808 according to the determination of stage 708b. If it is determined not to store the received content object, the object can be ignored (not stored) at stage 812. If it is determined to store the received content object, the received content object can be stored in the subscriber cache at stage 824. For example, a determine is made as to whether the subscriber cache is full at stage 814 (e.g., the subscriber cache can be assumed to be full at steady state operation, or the determination can be made at each instance of the method 800b). When the cache is determined to have sufficient capacity to store the received content object, embodiments can store the object in the subscriber cache at stage 824. When the subscriber cache is determined to be full at stage 814, some implementations, prior to storing the received content object, analyze other cached content objects (those presently stored in the subscriber cache) to identify one or more of the cached content objects to remove to make room for the received content object.

Two illustrative analyses are shown according to different embodiments. In some embodiments, at stage 816a, the subscriber-side system can identify one or more cached content objects for removal without using the received control data. For example, the subscriber cache can be aware of its presently cached content objects (or data blocks) that are most stale, have storage scores indicating lowest likelihoods of subscriber engagement, etc. In other embodiments, at stage 816b, the subscriber-side system can identify one or more cached content objects for removal according to the received control data. In certain such embodiments, the control data includes a directive that instructs the subscriber-side system as to which cached content objects (or set of blocks) to remove (e.g., determined by the provider-side cache manager according to the subscriber cache models). In other such embodiments, the received control data can be compared to storage scores of cached content objects (e.g., the scores can be stored along with the cached content objects, calculated as needed, stored in a separate location, etc.) to determine which cached content objects have storage scores indicating a lower likelihood of subscriber engagement than that of the received content object.

Regardless of the technique used to determine which cached content object, cached content objects, data blocks, etc. to remove, the identified cached content objects can be removed from the subscriber cache at stage 820 to make room for the newly received content object. For example, the identified object can be the content object having the least likelihood of subscriber engagement (e.g., the most stale, already consumed, etc.). In some instances, depending on the size of the received content object relative to other cached content objects, multiple content objects are identified and removed to make room for the received content object. In other instances, only a portion of a cached content object is removed to make room for a smaller received content object. Certain implementations remove the cached content object by deleting the object data from cache, while other implementations move the content object to a different class of storage, a different storage location, etc. When sufficient room is available, the received content object can be stored in the subscriber cache at stage 824.

Figure 9:
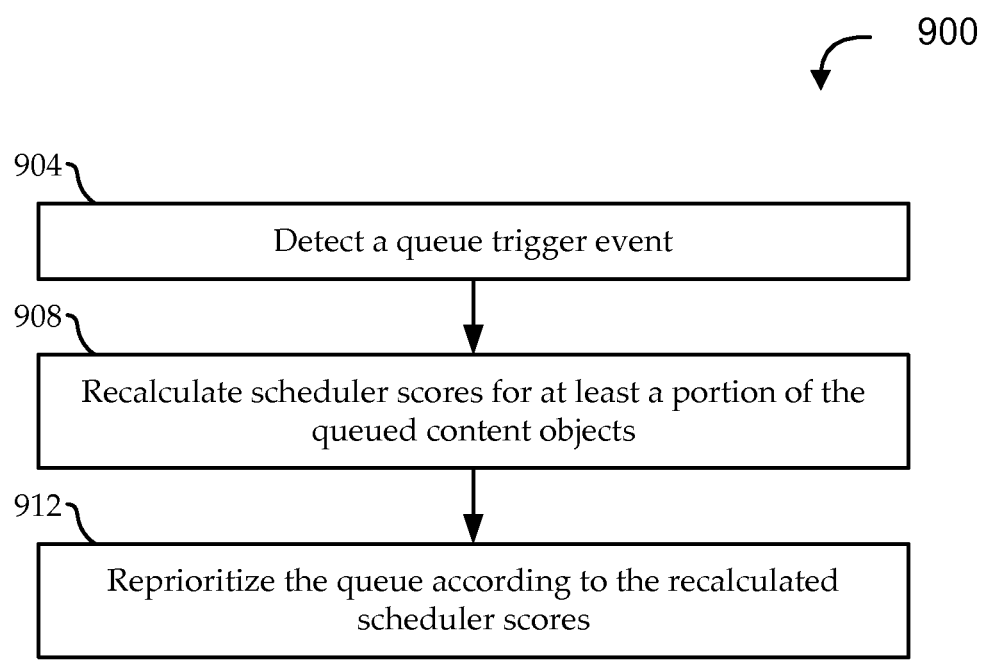
FIG. 9 shows a flow diagram of an illustrative method for re-prioritizing the delaycast queue according to a queue trigger event, according to various embodiments.

FIG. 9 shows a flow diagram of an illustrative method 900 for re-prioritizing the delaycast queue according to a queue trigger event, according to various embodiments. The "queue trigger event" can include any type of detectable event at the provider-side system that can impact prioritization of content objects presently scheduled in the delaycast queue. For example, the queue trigger event can occur when there is receipt at the provider-side system of another request for the delayable content object (e.g., the object can be given higher priority because its communication can satisfy more explicit requests); receipt at the provider-side system of another request for a content object related to the delayable content object (e.g., a content object with higher or lower priority in the delaycast queue; an object including content, like another episode of a television program or other related content, that indicates that other objects in the delaycast queue should be treated as more globally popular; etc.); addition, removal, or re-prioritization of another content object with respect to the provider-side queue (e.g., causing other objects to be rearranged and/or re-evaluated); etc. For example, determining in the method 600 of FIG. 6 that the requested content object is a delayable object and assigning the object to the delaycast queue can be considered as a queue trigger event when assigning the new object to the queue can impact other portions of the queue.

At stage 904, a queue trigger event is detected that impacts the provider-side queue. The scheduler score for the delayable content object can be recalculated at stage 908, according to the set of link-level scalars in response to the queue trigger event. At stage 912, at least a portion of the provider-side queue can be reprioritized according to the recalculated scheduler score of the delayable content object.

The methods disclosed herein include one or more actions for achieving the described method. The method and/or actions can be interchanged with one another (e.g., to be performed in different orders, in series or in parallel, etc.) without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for management of content in a communications infrastructure over which a provider-side system is in communication with a plurality of subscriber-side systems, the method comprising:

identifying content in the communications infrastructure, wherein the communications infrastructure comprises a shared communications link between the provider-side system and the plurality of subscriber-side systems;

calculating a storage score for the content, wherein the storage score is calculated according to a set of storge-level scalars, wherein the storage score reflects a likelihood that a subscriber-side system of the plurality of subscriber-side systems will engage with the content, and wherein the subscriber-side system comprises a non-requesting subscriber for the content; and determining whether the content is to be stored at the subscriber-side system based on the storage score for the content;

wherein the set of storage-level scalars includes a portal subscore indicative of a relationship of the content to one or more media portals.

2. The method of claim 1, wherein
the content is multicastable to the plurality of subscriber-side systems based on a scheduler score according to a set of link-level scalars, and
wherein the storage score is calculated according to the set of storge-level scalars different from the link-level scalars.

3. The method of claim 1, wherein the set of storage-level scalars includes an engagement subscore indicative of a level of engagement of the subscriber-side system with the content.

4. The method of claim 3, wherein the level of engagement is at least in part based on one or more of a hover in which a user hovers a mouse cursor over an indication of the content; a click comprising a selection of an icon to receive more information about the content without a request for the content; a wish comprising an explicit opting by the user for opportunistically delayed delivery of the content; or a watch comprising an explicit opting by the user for substantially real-time delivery of the content without a request for the content.

5. The method of claim 1, wherein the portal subscore is at least in part based on one or more of whether the content is one of a top ten recently watched items on the one or more media portals, one of a top ten items queued by the subscriber-side system on the one or more media portals, or one of a top 25 objects recommended to the subscriber-side system by the one or more media portals.

6. The method of claim 1, wherein the set of storage-level scalars each comprise a tunable weighting factor that determines a relative impact of each of the set of storage-level scalars on the storage score.

7. The method of claim 1, wherein the set of storage-level scalars comprises at least one of: a size of the content; a global popularity scalar associated with the content; a cluster popularity scalar associated with the content and a subscriber cluster to which the subscriber-side system belongs; a storage staleness scalar; a subscriber device compatibility scalar; a subscriber profile compatibility scalar; a subscriber interaction scalar associated with at least one subscriber-side system associated with the subscriber cluster; or a subscriber consumption scalar associated with at least one subscriber-side system associated with the subscriber cluster.

8. The method of claim 1, wherein the content comprises a content object.

9. The method of claim 8, wherein the content object comprises a plurality of content chunks, and wherein the storage for the content object is based one or more of the content chucks.

10. The method of claim 9, wherein the one or more of the content chucks comprises less than an entirety of the content object.

11. The method of claim 1, wherein the determining of whether the content is to be stored at the subscriber-side system is based on a comparison of the storage score to cached content presently stored in a subscriber-side cache.

12. The method of claim 11, wherein the comparison is between the storage score of the content and a similar score of the cached content presently stored in the subscriber-side cache.

13. The method of claim 12, wherein the comparison is performed when the subscriber-side cache is full to determine whether to replace the cached content presently stored in the subscriber-side cache with the content.

14. The method of claim 12, wherein the comparison is performed at the subscriber-side system based on the storage score of the content relative to the similar score of the cached content at the subscriber-side system.

15. The method of claim 11, wherein the comparison is performed at a provider-side of the communication infrastructure based on the storage score of the content relative to a subscriber cache model maintained at the provider-side of the communication infrastructure.

16. The method of claim 15, further comprising:
receiving, at the subscriber-side system, control data that instructs the subscriber-side system as to which of the cached content presently stored in the subscriber-side cache to remove for storage of the content.

17. The method of claim 1, further comprising:
determining the content to be delayable content requested by at least one of a plurality of subscriber-side systems that includes the subscriber-side system.

18. The method of claim 17, further comprising:
assigning the delayable content to queue of content in a priority order relative to other content in the queue.

19. The method of claim 18, further comprising:
multicasting the content from the queue to the subscriber-side system.

20. A system for management of content in a communications infrastructure over which a provider-side system is in communication with a plurality of subscriber-side systems, the system comprising:
a shared communications link between the provider-side system and the plurality of subscriber-side systems;
a content handling subsystem configured to identify content in the communications infrastructure; and
a storage manager subsystem, in communication with the content handling subsystem, and configured to calculate a storage score for the content, wherein the storage score is calculated by the storage manager subsystem according to a set of storge-level scalars, wherein the storage score reflects a likelihood that a subscriber-side system of the plurality of subscriber-side systems will engage with the content, the storage score providing a basis for determining whether the content is to be stored at the subscriber-side system, and wherein the subscriber-side system comprises a non-requesting subscriber for the content;
wherein the set of storage-level scalars includes a portal subscore indicative of a relationship of the content to one or more media portals.

21. The system of claim 20, wherein
the content is multicastable to the plurality of subscriber-side systems based on a scheduler score according to a set of link-level scalars, and wherein the storage score is calculated according to the set of storge-level scalars different from the link-level scalars.

22. The system of claim 20, wherein the set of storage-level scalars includes an engagement subscore indicative of a level of engagement of the subscriber-side system with the content.

23. The system of claim 22, wherein the level of engagement is at least in part based on one or more of a hover in which a user hovers a mouse cursor over an indication of the content; a click comprising a selection of an icon to receive more information about the content without a request for the content; a wish comprising an explicit opting by the user for opportunistically delayed delivery of the content; or a watch comprising an explicit opting by the user for substantially real-time delivery of the content without a request for the content.

24. The system of claim 20, wherein the portal subscore is at least in part based on one or more of whether the content is one of a top ten recently watched items on the one or more media portals, one of a top ten items queued by the subscriber-side system on the one or more media portals, or one of a top 25 objects recommended to the subscriber-side system by the one or more media portals.

25. The system of claim 20, wherein the set of storage-level scalars each comprise a tunable weighting factor that determines a relative impact of each of the set of storage-level scalars on the storage score.

26. The system of claim 20, wherein the set of storage-level scalars comprises at least one of: a size of the content; a global popularity scalar associated with the content; a cluster popularity scalar associated with the content and a subscriber cluster to which the subscriber-side system belongs; a storage staleness scalar; a subscriber device compatibility scalar; a subscriber profile compatibility scalar; a subscriber interaction scalar associated with at least one subscriber-side system associated with the subscriber cluster; or a subscriber consumption scalar associated with at least one subscriber-side system associated with the subscriber cluster.

27. The system of claim 20, wherein the content comprises a content object.

28. The system of claim 27, wherein the content object comprises a plurality of content chunks, and wherein the storage score for the content is based one or more of the content chucks.

29. The system of claim 28, wherein the one or more of the content chucks comprises less than an entirety of the content object.

30. The system of claim 20, further comprising:
a subscriber-side cache, wherein the determining of whether the content is to be stored at the subscriber-side system is based on a comparison to cached content presently stored in the subscriber-side cache.

31. The system of claim 30, wherein the comparison is between the storage score of the content and a similar score of the cached content presently stored in the subscriber-side cache.

32. The system of claim 31, wherein the comparison is performed when the subscriber-side cache is full to determine whether to replace the cached content presently stored in the subscriber-side cache with the content.

33. The system of claim 31, wherein the comparison is performed at the subscriber-side system based on the storage score of the content relative to the similar score of the cached content at the subscriber-side system.

34. The system of claim 30, wherein the comparison is performed at a provider-side of the communication infrastructure based on the storage score of the content relative to a subscriber cache model maintained at the provider-side of the communication infrastructure.

35. The system of claim 34, wherein control data is provided from the provider-side to the subscriber-side system that instructs the subscriber-side system as to which of the cached content presently stored in the subscriber-side cache to remove for storage of the content.

36. The system of claim 20, further comprising:
a communications subsystem configured to determine the content to be delayable content requested by at least one of a plurality of subscriber-side systems that includes the subscriber-side system.

37. The system of claim 36, wherein the communications subsystem is configured to assign the delayable content to queue of content in a priority order relative to other content in the queue.

38. The system of claim 37, wherein the communications subsystem is configured to multicast the content from the queue to the subscriber-side system.

* * * * *